United States Patent [19]
Tsujimoto et al.

[11] Patent Number: 5,468,822
[45] Date of Patent: Nov. 21, 1995

[54] POLYBUTADIENE COMPOSITION AND PROCESS FOR PRODUCING SAME

[75] Inventors: Nohiro Tsujimoto, Edogawa; Kenichi Hongyo, Ichihara; Yoshisuke Baba, Chiba; Michinori Suzuki; Kazuhiro Akikawa, both of Ichihara, all of Japan

[73] Assignee: UBE Industries, Ltd., Yamaguchi, Japan

[21] Appl. No.: 193,806

[22] Filed: Feb. 8, 1994

[30] Foreign Application Priority Data

Feb. 9, 1993 [JP] Japan ...................................... 5-02136

[51] Int. Cl.$^6$ .............................. C08F 36/06; C08F 2/18
[52] U.S. Cl. .................... 526/340.1; 526/78; 526/81; 526/86; 526/93; 526/94; 526/136; 526/138; 526/139; 526/140; 526/141; 526/142; 526/335; 525/232; 525/236; 428/402
[58] Field of Search ...................................... 525/236, 232; 526/81, 86, 78, 91, 94, 138, 139, 140, 141, 142, 340.1, 93, 136, 335; 428/402

[56] References Cited

U.S. PATENT DOCUMENTS

| | | |
|---|---|---|
| 4,429,085 | 1/1984 | Henderson et al. . |
| 4,506,031 | 3/1985 | Henderson et al. . |
| 4,645,809 | 2/1987 | Bell . |
| 4,742,137 | 5/1988 | Ono et al. . |
| 4,790,365 | 12/1988 | Sandstrom et al. ................. 525/236 X |
| 5,011,896 | 4/1991 | Bell et al. . |

FOREIGN PATENT DOCUMENTS

| | | |
|---|---|---|
| 0307341 | 3/1989 | European Pat. Off. . |
| 05175347 | 12/1992 | European Pat. Off. . |
| 60-147410 | 8/1985 | Japan . |
| 61-23610 | 2/1986 | Japan . |
| 61-31407 | 2/1986 | Japan . |

OTHER PUBLICATIONS

Hackh's Chemical Dictionary (4th ed.) McGraw–Hill, Inc., N.Y., 727 (1969).

*Primary Examiner*—Fred Teskin
*Attorney, Agent, or Firm*—Burgess, Ryan and Wayne

[57] ABSTRACT

A 1,2-polybutadiene composition having an excellent reinforcing effect for rubber and synthetic resin materials including at least two polybutadiene components different in melting point from each other and each having, as a main structure, a 1,2-polybutadiene structure, produced by polymerizing a 1,3-butadiene-containing monomer in a water-containing polymerization system in the presence of a catalyst comprising a transition metal compound, an organic compound of one of the Group I to III metals, and one of carbon disulfide, phenyl isothiocyanate, and xanthic acid compounds, while adding a melting point-regulating agent comprising at least one of ketones, aldehydes, alcohols, esters, nitriles, sulfoxides, amides, and phosphoric acid esters in one or two or more separate adding operations or a continuous adding operation.

6 Claims, 13 Drawing Sheets

DSC CHART (EXAMPLE 1)

DSC CHART (EXAMPLE 5)

DSC CHART (EXAMPLE 6)

191.2°C

TEMPERATURE (°C)

DSC CHART (EXAMPLE 7)

POLYBUTADIENE COMPOSITION AND PROCESS FOR PRODUCING SAME

BACKGROUND OF THE INVENTION

1. Field of the Invention

The present invention relates to a polybutadiene composition comprising at least two polybutadiene components different in melting temperature from each other and each having, as a principal structure, a 1,2-polybutadiene structure, and a process for producing the same.

The polybutadiene composition of the present invention is useful for modifying synthetic polymeric materials and for reinforcing rubber materials.

2. Description of the Related Art

A polybutadiene having, as a principal structure, a 1,2-polybutadiene structure, which will be referred to as "1,2-polybutadiene" hereinafter, has vinyl groups located in side chains thereof and thus is expected to be excellent in a mix-kneading property with other polymers and elastomers. Also, it is known that the 1,2-polybutadiene having a relatively high melting temperature of about 150° C. is generally a tenacious resin. Accordingly, there have been attempts to obtain a tenacious resin alloy by blending the above-mentioned 1,2-polybutadiene into various rubber or synthetic resin materials.

However, it is also known that where the conventional 1,2-polybutadiene resin having a high melting temperature of about 150° C. is blended with rubber or synthetic resin materials in a simple manner, a problem occurs that the 1,2-polybutadiene resin cannot be satisfactorily dispersed therein. Further, when a conventional 1,2-polybutadiene resin having a relatively low melting temperature of from about 100° C. to about 120° C. is blended into a different type of polymer, there occurs a problem that the reinforcing effect of the 1,2-polybutadiene resin is unsatisfactory.

SUMMARY OF THE INVENTION

An object of the present invention is to solve the above-mentioned problems of the conventional 1,2-polybutadiene resins and to provide a novel 1,2-polybutadiene composition having a high reinforcing effect for rubber and synthetic resin materials and a process for producing the same.

The above-mentioned object can be attained by the novel polybutadiene composition of the present invention comprising at least two polybutadiene components different in melting temperature from each other and each having, as a principal structure, a 1,2-polybutadiene structure.

In the polybutadiene composition of the present invention, each polybutadiene component preferably consists essentially of a polybutadiene composed of a syndiotactic 1,2-structure.

In the polybutadiene composition of the present invention, among the at least two polybutadiene components different in melting temperature from each other, the component having the highest melting temperature preferably has a melting temperature of 155° C. or more.

In the polybutadiene composition of the present invention, among the at least two polybutadiene components different in melting temperature from each other, the component having the highest melting temperature is preferably present in an amount of 5 to 65% by weight based on the total weight of the composition.

In the polybutadiene composition of the present invention, among the at least two polybutadiene components different in melting temperature from each other, the component having the highest melting temperature is preferably dispersed in a matrix consisting of another component or components.

In the polybutadiene composition of the present invention, the dispersed polybutadiene component having the highest melting temperature is preferably in the form of fine grains, scales, flakes, or short fibers.

The polybutadiene composition of the present invention can be produced by a process comprising suspension-polymerizing a butadiene monomer comprising as a principal component 1,3-butadiene in a polymerization system containing water in the presence of a catalyst comprising at least one transition metal compound, at least one of the organic compounds of Group I to III metals, and at least one member selected from the group consisting of carbon disulfide, phenyl isothiocyanate, and xanthic acid compounds, characterized in that after the polymerization is started, a melting temperature-regulating agent comprising at least one selected from the group consisting of ketones, aldehydes, alcohols, esters, nitriles, sulfoxides, amides, and phosphoric acid esters is added into the polymerization system in one adding operation or in two more separate adding operations.

Also, the polybutadiene composition of the present invention can be produced by another process comprising suspension-polymerizing a butadiene monomer comprising as a principal component 1,3-butadiene in a polymerization system containing water in the presence of a catalyst comprising at least one transition metal compound, at least one of the organic compounds of Group I to III metals, and at least one member selected from the group consisting of carbon disulfide, phenyl isothiocyanate, and xanthic acid compounds, characterized in that the polymerization is carried out while continuously adding a melting temperature-regulating agent comprising at least one member selected from the group consisting of ketones, aldehydes, alcohols, esters, nitriles, sulfoxides, amides and phosphoric acid esters into the polymerization system.

DESCRIPTION OF THE PREFERRED EMBODIMENTS

Figure 1:
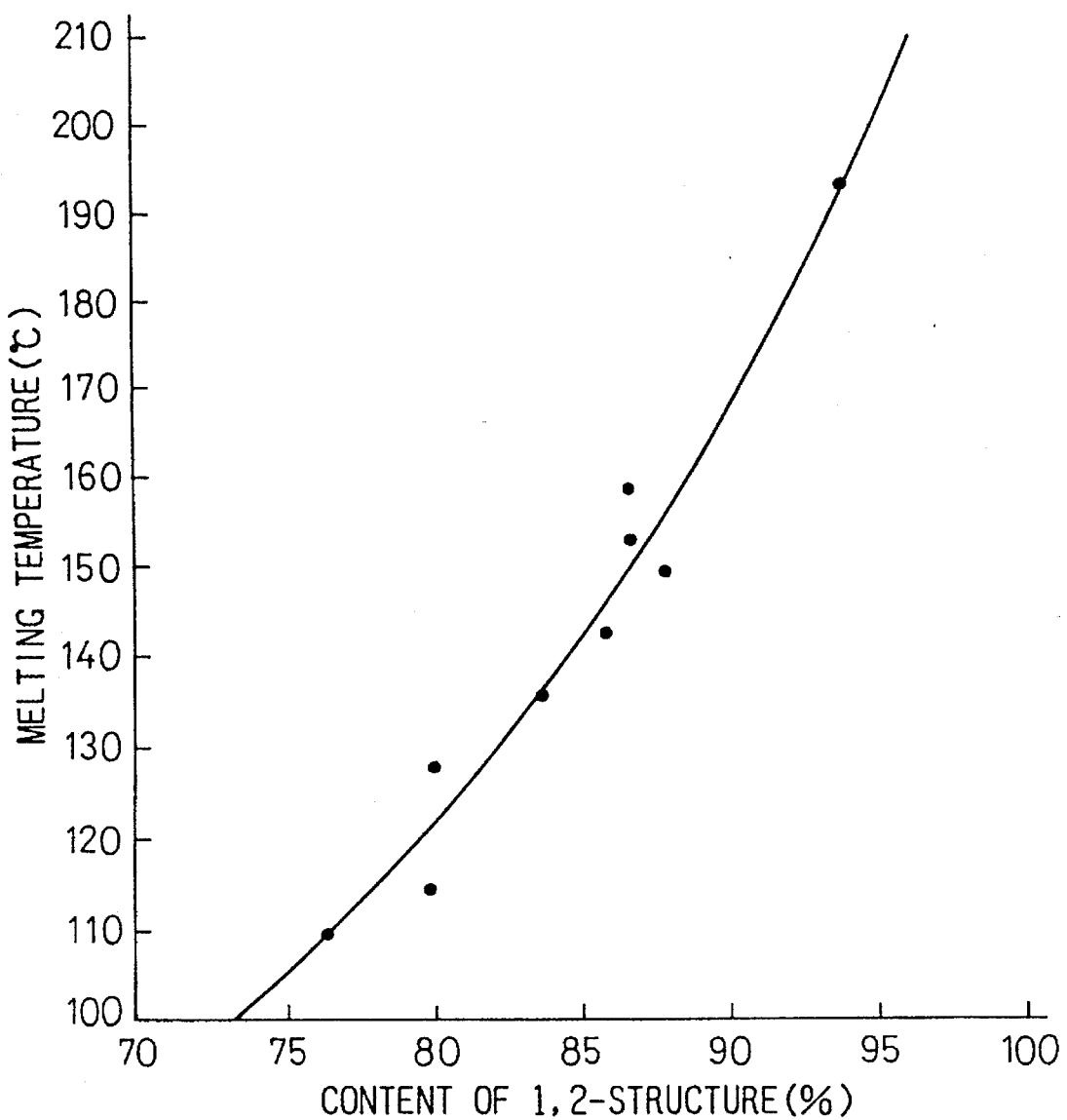
FIG. 1 shows a calibration curve showing a relationship between a melting temperature of 1,2-polybutadiene and a content of syndiotactic 1,2-structure in the 1,2-polybutadiene.

In the polybutadiene composition of the present invention, the total content of the two or more polybutadiene components having, as a principal structure, the 1,2-polybutadiene structure 3, which components will be referred to as 1,2-polybutadiene components hereinafter, is preferably 90% by weight or more, more preferably 95% by weight or more, based on the total weight of the composition.

The polybutadiene composition of the present invention may contain 10% by weight or less, preferably 5% by weight or less, of other polymers, for example, cis-1,4-polybutadiene and trans-1,4-polybutadiene, which are different from 1,2-polybutadiene, and polyisoprene and polybutene, which are derived from impurities contained in a 1,3-butadiene monomer material fed to a polymerization process for producing the polybutadiene composition of the present invention.

The 1,2-polybutadiene polymers serving as components for forming the polybutadiene composition of the present invention are preferably composed substantially of a syndiotactic 1,2-polybutadiene structure. More particularly, the content of the syndiotatic 1,2-polybutadiene structure in each of the 1 2-polybutadiene components of the present invention is 75 molar % or more, more preferably 80 molar % or more. When the content of the syndiotactic 1,2-polybutadiene structure is less than 75 molar %, sometimes the resultant 1,2-polybutadiene components have an unsatisfactorily low melting temperature of, for example, 100° C. or less and exhibit significant rubber-like properties. If this rubber-like 1,2-polybutadiene composition is blended to a rubber or a synthetic resin, the resultant reinforcing effect is poor and the resultant rubber or resin blend is not suitable for practical use.

However, if the content of the syndiotactic 1,2-polybutadiene structure is 75 molar % or more, the resultant 1,2-polybutadiene components me contain an atactic 1,2-structure, isotactic 1,2-structure, cis-1,4-structure, and/or trans-1,4-structure in addition to the syndiotactic 1,2-structure.

The molecular structure of the 1,2-polybutadiene components can be identified by an infrared absorption method, for example, the Morero method, the $^1$H-NMR method, or the $^{13}$C-NMR method.

It is known that there is a particular relationship between the content of a syndiotactic 1,2-structure in the 1,2-polybutadiene and the melting temperature of the resultant polymer. It is considered that the relationship is maintained unchanged even in a composition consisting of two or more types of 1,2-polybutadiene components. Therefore it is possible to determine the content of the syndiotactic 1,2-structure in the 1,2-polybutadiene component from the melting temperature of the 1,2-polybutadiene determined from a DSC chart for the component, by using a calibration curve preliminarily provided and showing a relationship between the content of the syndiotactic 1,2-structure and the melting temperature of the 1,2-polybutadiene.

In the two or more 1,2-polybutadiene components contained in the polybutadiene composition of the present invention, the content of the 1,2-polybutadiene component having the highest melting temperature, which will be referred to as the high melting temperature 1,2-polybutadiene component, is preferably in a content of 5 to 65% by weight, more preferably 20 to 54% by weight, based on the total weight of the composition. When the content of the high melting temperature 1,2-polybutadiene component is less than 5% by weight or more than 65% by weight, the resultant 1,2-polybutadiene component blended, as an reinforcing material, to a rubber or synthetic resin material, sometimes exhibits the same unsatisfactory reinforcing effect as that of conventional 1,2-polybutadiene material.

The high melting temperature 1,2-polybutadiene component in the composition of the present invention preferably has a melting temperature of 155° C. or more, more preferably 165° C. or more, still more preferably from 175° C. to 230° C. When the melting temperature of the high melting temperature 1,2-polybutadiene component is less than 155° C., the resultant 1,2-polybutadiene component blended to a rubber or synthetic resin material sometimes exhibits the same unsatisfactory reinforcing effect as that of the conventional 1,2-polybutadiene material.

The 1,2-polybutadiene component having the lowest melting temperature, which will be referred to as the lowest melting temperature 1,2-polybutadiene component, in the components of the polybutadiene composition of the present invention, preferably has a melting temperature of 105° C. or more but not more than 155° C. A 1,2-polybutadiene component having a melting temperature lower than 105° C. usually has a content of the syndiotactic 1,2-structure of less than 7 molar % and exhibit elastomeric properties and thus does not have a satisfactory reinforcing effect on the rubber or synthetic resin materials.

In the polybutadiene composition of the present invention, the difference in melting temperature between the high melting temperature 1,2-polybutadiene component and the low melting temperature 1,2-polybutadiene component is preferably in a range of from 10° C. to 125° C., more preferably from 20° C. to 125° C., still more preferably 30° C. to 125° C.

The melting temperature of each 1,2-polybutadiene component and the content of the high melting temperature 1,2-polybutadiene component in the polybutadiene composition of the present invention can be determined from, for example, a DSC chart thereof. When a DSC chart is determined for the polybutadiene composition of the present invention, two or more endothermic peaks or a wide endothermic peak band is found on the DSC chart. The temperature corresponding to the endothermic peak which appears at the highest temperature side of the peaks can represent the melting point of the high melting temperature 1,2-polybutadiene component, and the temperature corresponding to the endothermic peak appearing at the lowest temperature side of the peaks can represent the melting point of the low melting temperature 1,2-polybutadiene component. Also, a content ratio of the high melting temperature 1,2 -polybutadiene component to the low melting temperature 1,2-polybutadiene component can be obtained from the ratio in area of the highest temperature side peak to the lowest temperature side peak.

Also, it is known that 1,2-polybutadiene resins having a melting temperature of less than 155° C. can be easily dissolved in various organic solvents, for example, toluene, and other 1,2-polybutadiene resins having a melting temperature of 190° C. or more are substantially not dissolved in the solvents, for example, toluene. By utilizing the above-mentioned phenomena, the content of the high melting temperature 1,2-polybutadiene component in the polybutadiene composition of the present invention can be obtained.

In the polybutadiene composition of the present invention, it is preferable that the high melting temperature 1,2-polybutadiene component be finely dispersed in a matrix composed essentially of another 1,2-polybutadiene component or components having a melting temperature lower than that of the high melting temperature 1,2-polybutadiene component.

More particularly, it is preferable that the high melting temperature 1,2-polybutadiene component be dispersed in the form of fine grains, scales, flakes, and/or short fibers in a matrix composed substantially of another 1,2-polybutadiene component or components having a melting temperature lower than that of the high melting temperature 1,2-polybutadiene component.

The dispersed 1,2-polybutadiene component particles preferably have, when they are in the form of fine grains, scales, and/or flakes, a major axis of 0.01 to 10 μm, more preferably 0.01 to 2 μm, still more preferably 0.1 to 1 μm, and when they are in the form of short fibers, a fiber thickness of 0.01 to 1 μm, more preferably 0.1 to 1 μm, and an aspect ratio, namely a ratio of fiber length to fiber thickness, in a range of from 1 to 10,000.

When the major axis of the fine grain, scale, and/or flake-shaped high melting temperature 1,2 -polybutadiene component particles is more than 10 μm, the resultant component particles serve rather as defective dispersoids in the composition, and thus the resultant butadiene composition sometimes does not exhibit a satisfactory reinforcing effect when blended to a rubber or synthetic resin material. The form of the high melting temperature 1,2-polybutadiene component dispersed in the matrix can be identified by a method in which the 1,2-polybutadiene component or components having a melting temperature lower than that of the high melting temperature 1,2-polybutadiene component are dissolved or extracted away from the composition by using a solvent, or example, toluene, and the form of the residual component is observed by using an electron microscope.

The above-mentioned polybutadiene composition can be produced by the production process (1) or (2) of the present invention.

In the processes (1) and (2) of the present invention, a butadiene monomer comprising, as a principal component, 1,3-butadiene, is suspension-polymerized in a polymerization system containing water in the presence of a catalyst comprising (i) at least one transition metal compound, (ii) at least one of the organic compounds of Group I to III metals in the Periodic Table, and (iii) at least one member selected from the group consisting of carbon disulfide, phenyl isothiocyanate, and xanthic acid compounds.

In the process (1), a melting temperature-regulating agent consisting at least one member selected from the group consisting of ketones, aldehydes, alcohols, esters, nitriles, sulfoxides, amides, and phosphoric acid esters is added into the polymerization system in one adding operation or in two or more separate adding operations, and in the process (2), the polymerization is carried out while the above-mentioned melting temperature-regulating agent is continuously added into the polymerization system, to produce the above-mentioned specific polybutadiene composition.

It is known that by adding the above-mentioned melting temperature-regulating agent to the polymerization system containing the 1,3-butadiene monomer, a 1,2-polybutadiene resin having a relatively low melting temperature is obtained and the melting temperature of the 1,2-polybutadiene resin is lowered with an increase in an amount of the melting temperature-regulating agent added to the polymerization system.

The polybutadiene composition of the present invention can be made even by the solution polymerization method. Nevertheless, the suspension polmerization method and the emulsion polymerization method are preferably utilized to produce the polybutadiene composition of the present invention, because those methods enable the resultant polybutadiene composition to have a high average degree of polymerization and the generated polymerization heat to be easily removed, are easy in operation, and have a high safety The process of the present invention for producing the above-mentioned specific polybutadiene composition by the suspension-polymerization method will be explained in detail below.

In the polymerization system usable for the processes (1) and (2) of the present invention, a dispersion of, for example, an inorganic salt, for example, calcium chloride, a dispersing agent, for example, polyvinyl alcohol, and if necessary, a surface active agent, dispersed or dissolved in water, which are usually used for conventional suspension-polymerization of the 1,3-butadiene monomer can be preferably utilized. The content of the dispersing agent is preferably in a range of from 0.01 to 1 part by weight of water. Also water is contained in an amount of 1 to 30 moles per mole of 1,3-butadiene in the polymerization system.

In the processes (1) and (2) of the present invention, the catalyst comprising (i) at least one transition metal compound, (ii) at least one member selected from organic compounds of Group I to III metals, and (iii) at least one member selected from the group consisting of carbon disulfide, phenyl isothiocyanate, and xanthic acid compounds, which member (iii) will be referred to as the catalyst component (iii), is used.

The transition metal compound is employed preferably in an amount, in terms of transition metal atoms used, of 0.00001 to 0.01 mole per mole of 1,3-butadiene contained in the polymerization system. The ratio in molar amount of the transition metal compound to the Group I to III metal organic compound in the catalyst is preferably in a range of from 0.1 to 500 (mole/mole). Also, the ratio in molar amount of the catalyst component (iii) to the transition metal compound in the catalyst is preferably 1 or more.

The transition metal compound usable for the present invention is preferably selected from salts and complexes of cobalt, titanium, and nickel. The preferable transition metal compounds include cobalt salts, for example, cobalt chloride, cobalt bromide, cobalt nitrate, cobalt octylate, cobalt naphthenate, cobalt acetate, and cobalt malonate; organic base complexes, for example, cobalt bisacetylacetonate, cobalt triacetylacetonate, cobalt-ethyl acetoacetate, triarylphosphine complexes of cobalt halides, and trialkylphosphine complexes of cobalt halides; and pyridine complexes, picoline complexes, and ethyl alcohol complexes of the transition metals.

The organic compounds of the Group I to III metals preferably include organic lithium compounds, organic magnesium compounds, and organic aluminum compounds. The particularly preferable organic compounds of the Group I to III metals include trialkylaluminum, dialkylaluminum chloride, dialkylaluminum bromide, alkylaluminum sesquichloride, and alkylaluminum sesquibromide.

The monomer to be subjected to the processes (1) and (2) of the present invention contains, as a principal component, 1,3-butadiene. The monomer may contain a small amount (preferably 10 molar % or less) of conjugated dienes, for example, isoprene, chloroprene and myrcene; olefins, for example, ethylene, propylene, butene-1, butene-2, isobutene, and pentene-1, and/or aromatic vinyl compounds, for example, styrene and α-methylstyrene.

The alcohols, aldehydes, ketones, esters, nitriles, sulfoxides, amides, and phosphoric acid esters usable for the melting temperature-regulating agent may be selected from the compounds which may have only one functional group or two or more functional groups, as shown below.

The alcohols usable for the melting temperature-regulating agent are preferably selected from aliphatic alcohols, for example, methyl alcohol, ethyl alcohol, n-propyl alcohol, isopropyl alcohol, n-butyl alcohol, sec-butyl alcohol, tert-butyl alcohol, pentyl alcohol, hexyl alcohol and octyl alcohol; cycloaliphatic alcohols, for example, cyclobutyl alcohol, cyclopentyl alcohol, cyclohexyl alcohol, cyclododecyl alcohol; and aromatic alcohols, for example, benzyl alcohol, diphenylcarbinol, cinnamyl alcohol, o-anis alcohol, m-anis alcohol, and p-anis alcohol. Also, multivalent alcohols, for example, diols such as ethylene glycol and propylene glycol and triols such as glycerol are preferably usable for the melting temperature-regulating agent.

The ketones usable for the melting temperature-regulating agent are preferably selected from aliphatic ketones, for example, acetone, acetylacetone, methylethyl ketone, methylpropyl ketone, isopropylmethyl ketone, butylmethyl ketone, isobutylmethyl ketone, pinacolone, diethyl ketone, butyrone, diisopropyl ketone and diisobutyl ketone; cycloaliphatic ketones, for example, cyclobutanone, cyclopentanone, cyclohexanone and cyclododecanone; and aromatic ketones, for example, acetophenone, propiophenone, butyrophenone, valerophenone, benzophenone, dibenzylphenone and acetonaphthone. Also, diketone compounds can be used for the melting temperature-regulating agent.

The aldehydes usable for the melting temperature-regulating agent are preferably selected from aliphatic aldehydes, for example, formaldehyde, acetaldehyde, propionaldehyde, butylaldehyde, isobutylaldehyde, valeraldehyde, isovaleraldehyde, pivalic aldehyde, caproic aldehyde, heptyl aldehyde, capryl aldehyde, pelargonyl aldehyde, capric aldehyde, undecyl aldehyde, lauric aldehyde, tridecyl aldehyde, myristic aldehyde, pentadecyl aldehyde, palmitic aldehyde, and stearyl aldehyde; aliphatic dialdehydes, for example, glyoxal and succinic aldehyde; and aromatic aldehydes for example, benzaldehyde, o-toluic aldehyde, m-toluic aldehyde, p-toluic aldehyde, salicylic aldehyde, α-naphtoic aldehyde, β-naphthoic aldehyde, o-anis aldehyde, m-anis aldehyde, p-anis aldehyde and cinnamic aldehyde.

The esters usable for the melting temperature-regulating agent are preferably selected from saturated fatty acid esters, for example, acetic acid esters, propionic acid esters, butyric acid esters, valeric acid esters, capric acid esters, enathic acid esters, caproic acid esters, pelargonic acid esters, and undecylic acid esters; unsaturated fatty acid esters, for example, crotonic acid esters, isocrotonic acid esters, undecylenic acid esters, and oleic acid esters; aromatic carboxylic acid esters, for example, benzoic acid esters and phenylacetic acid esters; and ketonic acid esters, for example, acetoacetic acid esters.

The nitriles usable for the melting temperature-regulating agent are preferably selected from compounds represented by the general formula: RCN, in which R represents an organic group, for example, acetonitrile, benzonitrile, acrylonitrile, and propionitrile.

The sulfoxides usable for the melting temperature-regulating agent are preferably selected from compounds represented by the general formula: $R_1R_2S=O$ in which $R_1$ and $R_2$ represent an organic group, respectively. The sulfoxides are preferably selected from dimethyl sulfoxide, diethyl sulfoxide, di-n-propyl sulfoxide, di-n-butyl sulfoxide, diisoamyl sulfoxide, di-n-heptyl sulfoxide, divinyl sulfoxide, diallyl sulfoxide, diphenyl sulfoxide, dibenzyl sulfoxide, and methylallyl sulfoxide.

The amides usable for the melting temperature-regulating agent are selected from compounds represented by the general formula: $R_3R_4NCOR_5$ wherein $R_3$, $R_4$, and $R_5$ respectively represent a hydrogen atom or an organic group. The nitriles are preferably selected from, for example, N-methylformamide, N-ethylformamide, N-propylformamide, N,N-dimethylformamide, N,N-diethylformamide, N,N-dipropylformamide, N-methylacetamide, N-ethylacetamide, N,N-dimethylacetamide, N,N-diethylacetamide, N,N-dipropylacetamide, N-methylformanilide, N-ethylformanilide, N,N-diphenylformamide, N,N-diphenylformanilide. Also, cyclic amides, for example, propiolactam, butyrolactam, valerolactam, caprolactam, N-methylpyrrolidone, N-ethylpyrrolidone, and N-phenylpyrrolidone can be used for the melting temperature-regulating agent.

The phosphoric acid esters for the melting temperature-regulating agent are preferably selected from compounds represented by general formulae: $(R_6O)_3PO$, $(R_7O)(R_8O)_2PO$, and $(R_9O)(R_{10}O)(R_{11}O)PO$ wherein $R_6$, $R_7$, $R_8$, $R_9$, $R_{10}$ and $R_{11}$ respectively represent an organic group, for example, trimethyl phosphate, triethyl phosphate, tributylphosphate, and tri-p-methylphenyl phosphate.

In the processes (1) and (2) of the present invention, the polymerization system may contain an inert organic solvent with a high specific gravity. The organic solvent preferably comprises at least one member selected from halogenated aliphatic hydrocarbons, for example, methylene chloride, tetrachloromethane, chloroform, bromoform, and trichloroethylene; halogenated aromatic hydrocarbons, for example, chlorobenzene, bromobenzene, chlorotoluene, dichlorobenzene, dibromobenzene, hexachlorobenzene, and hexafluorobenzene; halogenated phenol compounds, for example, chlorophenol, bromophenol, pentachlorophenol and pentabromophenol; sulfoxide compounds, for example, dimethyl sulfoxide; and sulfuric acid diesters, for example, dimethyl sulfate and diethyl sulfate.

Particularly, the halogenated hydrocarbon compounds are more preferable for the inert organic solvent, because they substantially do not cause the melting temperature of the resultant 1,2-polybutadiene polymer to be reduced.

Preferably, the organic solvent having a high specific gravity is contained in an amount of 10 to 100 parts by volume, more preferably 20 to 80 parts by volume, still more preferably 40 to 60 parts by volume, per 100 parts by volume of 1,3-butadiene in the polymerization system. If the amount of the high specific gravity organic solvent per 100 parts by volume of 1,3-butadiene is more than 100 parts by volume, sometimes, the producibility of the polybutadiene composition is undesirably reduced. Also, if the amount of the high specific gravity organic solvent is less than 10 parts by volume per 100 parts by volume of 1,3-butadiene in the polymerization system, sometimes the resultant polybutadiene composition includes undesirably large polymer particles.

The polybutadiene composition of the present invention can be produced in accordance with the following steps.

First conjugated dienes such as 1,3-butadiene, isoprene, and/or myrcene are brought into contact with the transition metal compound and the Group I to III metal organic compound, and the resultant mixture is aged. The aging temperature is preferably in the range of from −60° C. to 50° C. The aging may be carried out in a solvent comprising at least one member selected from, for example, hydrocarbon solvents, for example, toluene, benzene, xylene, n-hexane, mineral spirits, solvent naphtha, and kerosine, and halogenated hydrocarbon solvents, for example, methylene chloride. However, the solvent for the aging is preferably selected from those non-reactive with the conjugated dienes, the transition metal compound, and the organic metal compound at the aging temperature.

Next, the aged liquid prepared in the aging step is dispersed in a polymerization system. The high specific gravity organic solvent may be preliminarily dispersed in the polymerization system or in the aging liquid. Otherwise, the aged liquid is added to the polymerization system and thereafter the high specific gravity organic solvent is added to the resultant polymerization system.

After dispersing the aged liquid, the resultant polymerization system is added with a catalyst component (iii), namely carbon disulfide etc. and then the polymerization procedure is started in the presence of water. The catalyst component (iii) may be preliminarily added alone or together with the high specific gravity organic solvent to the polymerization system, or may be mixed with the high specific gravity organic solvent and then the resultant mixture may be added to the polymerization system.

The polymerization temperature is preferably controlled to a level of from 0° C. to 100° C., more preferably from 10° C. to 50° C. When polymerized within the above-mentioned range of temperature, the resultant polybutadiene composition exhibits an excellent reinforcing effect on the rubber and synthetic resin materials.

In the process (1) of the present invention, after the polymerization procedure is started, the melting temperature-regulating agent comprising, for example, alcohol, aldehyde, ketone, and/or esters, etc. is added in one single adding operation or in separate two or more adding operations to the polymerization system. Preferably, the first addition of the melting temperature-regulating agent is carried out at a stage of at least 30 seconds after the start of the polymerization procedure. Where the addition of the melting temperature-regulating agent is carried out in separate two or more adding operations after the start of the polymerization procedure, one and the same type of melting temperature-regulating agent may be used in all the adding operations, or the-types of melting temperature-regulating agents used for two or more adding operations may be different from each other. Also, in the separate two or more adding operations, the time intervals between the adding operations are preferably at least 30 seconds.

In the process (1) of the present invention, it is allowed that a portion of the melting temperature-regulating agent be added to the polymerization system, and after the polymerization procedure is started, the remaining portion of the melting temperature-regulating agent be added to the polymerization system in the above-mentioned manner. Even in this case, the type of the melting temperature-regulating agent added to the polymerization system after the start of the polymerization may be the same as or different from that added before the start of the polymerization. Also, the first addition of the melting temperature-regulating agent after the start of the polymerization is preferably carried out at least 30 seconds after the start of the polymerization.

In each of the processes (1) and (2) of the present invention, the total amount of the melting temperature-regulating agent to be added to the polymerization system is preferably in the range of from 20 to 400 ml per 1000 ml of the total volume of 1,3-butadiene, water and the high specific gravity inert organic solvent in the polymerization system. The water is used preferably in the amount of 300 to 800 ml per 1000 ml of the total volume of 1,3-butadiene, water, and the high specific gravity inert organic solvent in the polymerization system. In the above-described process (1) of the present invention, the addition of the melting temperature-regulating agent is preferably carried out at the following stages.

(1) Where the melting temperature-regulating agent is added only after the start of the polymerization procedure:

① After the start of the polymerization, the first addition of the melting temperature-regulating agent is carried out at a stage at which the conversion to 1,2-polybutadiene reaches a level of from 5 to 65%, ② For example, where the polymerization is carried out in a batch type polymerization apparatus for a polymerization time of one hour, it is preferable that the first addition be carried out at a stage of 30 seconds to 20 minutes after the start of the polymerization, and the second and later additions be completed within 35 minutes from the start of the polymerization.

(2) Where a portion of the melting temperature-regulating agent is preliminarily added to the polymerization system or a portion of the melting temperature-regulating agent is mixed together with the catalyst component (iii) (namely, carbon disulfide etc.) to the polymerization system, and then the remaining portion of the melting temperature-regulating agent is added to the polymerization system after the start of the polymerization, it is preferable that ① the first addition of the remaining portion of the melting temperature-regulating agent be carried out at a stage at which the conversion to 1,2-polybutadiene reaches a level of 5 to 65%, ② for example, in a batch type polymerization for a polymerization time of one hour, the first addition be carried out at a stage of 30 seconds to 20 minutes after the start of the polymerization, and the second and later additions be completed within 35 minutes from the start of the polymerization.

Also, in the process (2) of the present invention, the melting temperature-regulating agent is continuously added to the polymerization system while the polymerization procedure is carried out.

In this process (2),

① the addition of the melting temperature-regulating agent is started simultaneously with the start of the polymerization and thereafter is continuously carried out, ② the addition of the melting temperature-regulating agent is started at a stage of 30 seconds to 10 minutes after the start of the polymerization and thereafter is carried out continuously, or ③ the addition of the melting temperature-regulating agent is continuously carried out over a portion of the entire polymerization time or over the entire polymerization time.

EXAMPLES

The present invention will be further explained by the following examples.

In the examples, the following properties were measured as follows:

Measurement methods (1) Melting temperature

In each of the examples and comparative examples, the melting temperature of the resultant 1,2-polybutadiene resin was determined from a DSC chart thereof. Namely, the melting temperature of the resin is represented by a temperature corresponding to an endothermic peak appearing on the DSC chart. The employed DSC was the Type SSC 5200 made by Seiko Denshi Kogyo K.K. The measurement was carried out for a sample in an amount of 10 mg at a heating rate of 10° C./min in a nitrogen gas atmosphere.

(2) Content of syndiotactic 1,2-structure

In each of the examples and comparative examples, the contents of the syndiotactic 1,2-structure in the resultant 1,2-polybutadiene components were determined in the following manner.

Each of the resultant 1,2-polybutadiene components different in melting temperature in a range of from 100° C. to 210° C. from each other was subjected to a $^1$H-NMR measurement, and the content of the 1,2-structure in the component was obtained from a peak area in the $^1$H-NMR chart. Also, by subjecting the 1,2-polybutadiene component to a $^{13}$C-NMR measurement, it was confirmed that almost all of the 1,2-structure of the component was syndiotactic. The results of the measurements were plotted on a graph to prepare a calibration curve showing the relationship between the melting temperatures of the 1,2-polybutadiene components and the contents of syndiotactic 1,2-structure in the components. The calibration curve is shown in FIG. 1.

For the $^1$H-NMR measurement and $^{13}$C-NMR measurements, a NMR tester FX-200 (trademark) made by Nihon Denshi K.K. was employed. The solvent used was o-chlorobenzene. The measurements were carried out in a TMS standard.

With respect to the polybutadiene compositions prepared in the examples and comparative examples, the melting temperature of each of high melting temperature 1,2-polybutadiene components and low melting temperature 1,2-polybutadiene components was determined in the above-mentioned manner, and the content of the syndiotactic 1,2-structure in each component was determined from the melting temperature thereof by using the above-mentioned calibration curve (FIG. 1).

(3) Content of high melting temperature 1,2-polybutadiene component

In each of the examples and comparative examples, a sample of the resultant polybutadiene composition in an amount of 2 g was packed with a 250 mesh metal net and immersed in a toluene solvent at a temperature of 80° C. to 90° C. for one hour to extract a toluene-soluble fraction of the composition into toluene. The toluene solvent contained a small amount of an antiaging agent, Irganox 1076 (trademark), dissolved in toluene. The residual fraction of the extracted polybutadiene composition was immersed in a fresh toluene solvent at a temperature of 80° C. to 90° C. for 30 minutes to completely extract away the toluene-soluble fraction from the composition.

After the toluene extraction was completed, the residual toluene-insoluble fraction was immersed in cyclohexane for one night and then freeze-dried. The freeze-dried toluene-insoluble fraction of the polybutadiene composition was subjected to a DSC measurement and it was confirmed that the resultant melting temperature obtained from the DSC measurement was of the high melting temperature 1,2-polybutadiene component in the composition. The amount of the residual toluene-insoluble fraction was recognized as an amount of the high melting temperature 1,2-polybutadiene component. The content of the high melting temperature 1,2-polybutadiene component in the polybutadiene composition was calculated from the amount of the residual toluene-insoluble fraction.

(4) Molecular weight

In each of the examples and comparative examples, the resultant polybutadiene composition was dissolved in o-dichlorobenzene, and the solution was subjected to a measurement of molecular weight of the polybutadiene by using gel permeation chromatography (GPC). As an eluting solution for the GDC, o-dichlorobenzene was employed and the GDC measurement was carried out at a temperature of 135° C. As standard substances, eight standard polystyrene resins respectively having molecular weights of $2.89 \times 10^6$, $7.75 \times 10^5$, $1.90 \times 10^5$, 35,000, 17,500, 4,000, 580, and 418 were employed.

EXAMPLE 1

Preparation of aged liquid

A 300 ml autoclave preliminarily filled with nitrogen gas was charged with 240 ml of a butadiene monomer, and then 1.6 ml of a solution of cobalt octoate in heptane in a concentration of 0.5 mole of cobalt octoate/liter of heptane were added to the butadiene monomer and then 2.4 ml of a solution of triethyl aluminum in heptane in a concentration of 1 mole of triethyl aluminum/liter of heptane were added to the butadiene monomer. The atomic ratio of cobalt to aluminum was 1:3. The resultant mixture was stirred at room temperature by a stirrer at a revolution rate of 500 rpm for 10 minutes to provide an aged liquid.

Polymerization

An inside space of an autoclave having a capacity of 1.5 liters and equipped with anchor type agitating wings was filled with nitrogen gas, and then 560 ml of ion-exchanged water which had been bubbled with nitrogen gas, 120 ml of methylene chloride, and a solution of 0.56 g of polyvinyl alcohol, which will be referred to as PVA hereinafter, in 40 ml of ion-exchanged water were fed into the autoclave. Then, the aged liquid was placed into the autoclave. The resultant mixture was stirred at a temperature of 10° C. at a revolution rate of 600 rpm for 10 minutes, and then 1.6 millimoles of carbon disulfide was added to the mixture to start the polymerization of the butadiene monomer. The polymerization procedure was carried out at a temperature of 30° C. while stirring the polymerization mixture at a revolution rate of 600 rpm. At a stage of 2.5 minutes after the start of the polymerization, 35 ml (0.48 mole) of acetone was added to the polymerization mixture.

Figure 10:
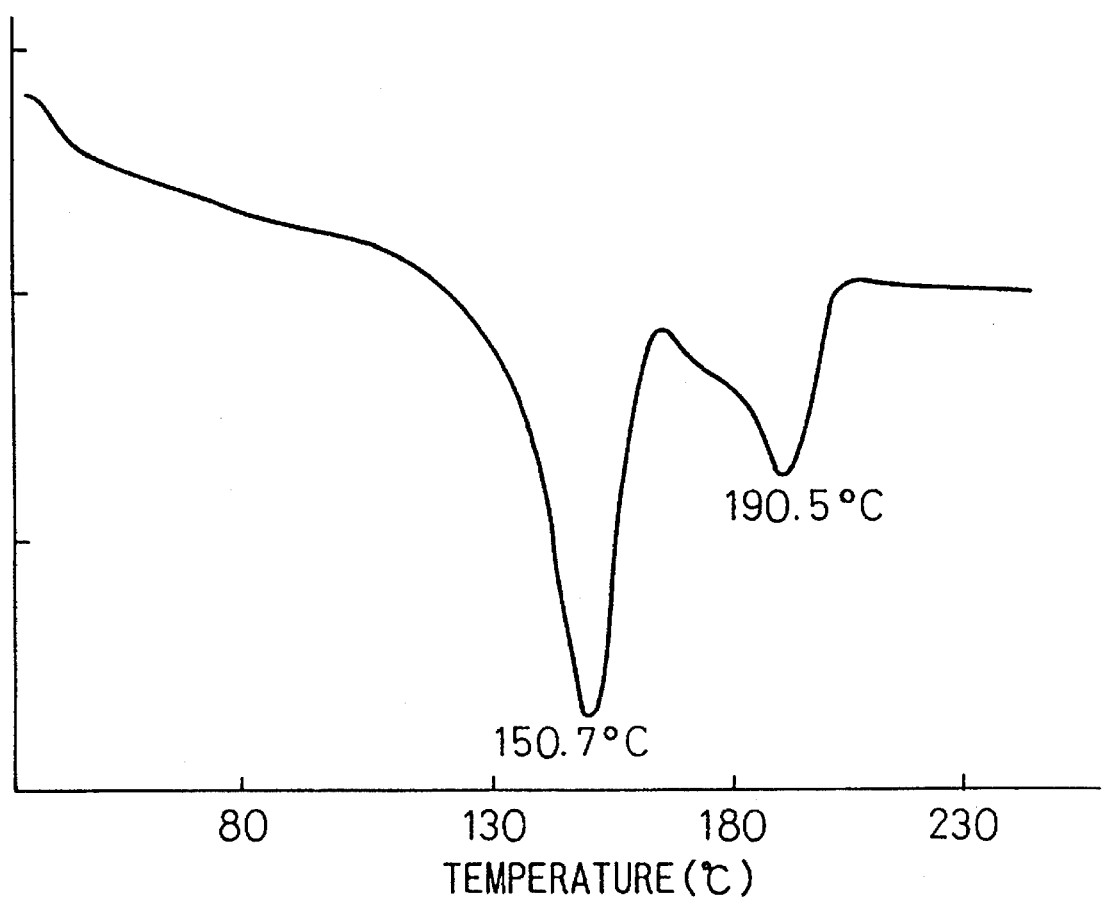
FIG. 10 is a differential scanning calorimetry (DSC) chart of the polybutadiene composition prepared in Example 1.

One hour after the start of the polymerization, the resultant polybutadiene composition in the form of fine grains was collected by way of filtration and the collected polybutadiene composition grains were immersed in a solution of 1% by weight of butylated hydroxytoluene (BHT) in methyl alcohol, and thereafter were dried in a vacuum dryer for one day. The resultant polybutadiene composition exhibited two melting temperatures of 190.5° C. and 150.7° C. The DSC chart for the resultant polybutadiene composition is shown in FIG. 10. The yield of the polybutadiene composition was 90.9%. The content of the high melting temperature 1,2-polybutadiene component was 23% by weight and the content of the low melting temperature 1,2-polybutadiene component was 77% by weight.

The resultant polybutadiene composition was subjected to a $^1$H-NMR measurement, and from the resultant $^1$H-NMR chart, a content of the syndiotactic 1,2-structure based on the total molar amount of the polybutadiene composition was calculated. As a result, the content of the syndiotactic 1,2-structure was 88.9 molar % based on the total molar amount of the polybutadiene composition.

The test results are shown in Table 1.

Contents of the syndiotactic 1,2-structure in the 1,2-polybutadiene components were determined in accordance with the calibration curve in FIG. 1. As results, the contents of the syndiotactic 1,2-structure were 92.8% in the high melting temperature 1,2-polybutadiene component and 87.5% in the low melting temperature 1,2-polybutadiene component. From the contents of the syndiotactic 1,2-polybutadiene in the high melting temperature 1,2-polybutadiene component and the low melting temperature 1,2-polybutadiene component, the content of the high melting temperature 1,2-polybutadiene component in the polybutadiene composition and the content of the low melting temperature 1,2-polybutadiene component in the polybutadiene composition, the content of the syndiotactic 1,2-polybutadiene fraction in the entire polybutadiene composition was calculated.

From the calculation:

92.8 molar %×0.23+87.5 molar %×0.77= 88.7 molar %, the resultant calculated content: 88.7 molar % of the syndiotactic 1,2-polybutadiene fraction was very similar to the measured content: 88.9 molar % from the $^1$H-NMR chart.

The contents of the 1,2-vinyl structure and the cis- 1,4-structure in the high and low melting temperature 1,2-polybutadiene components are shown in Table 2.

Figure 2:
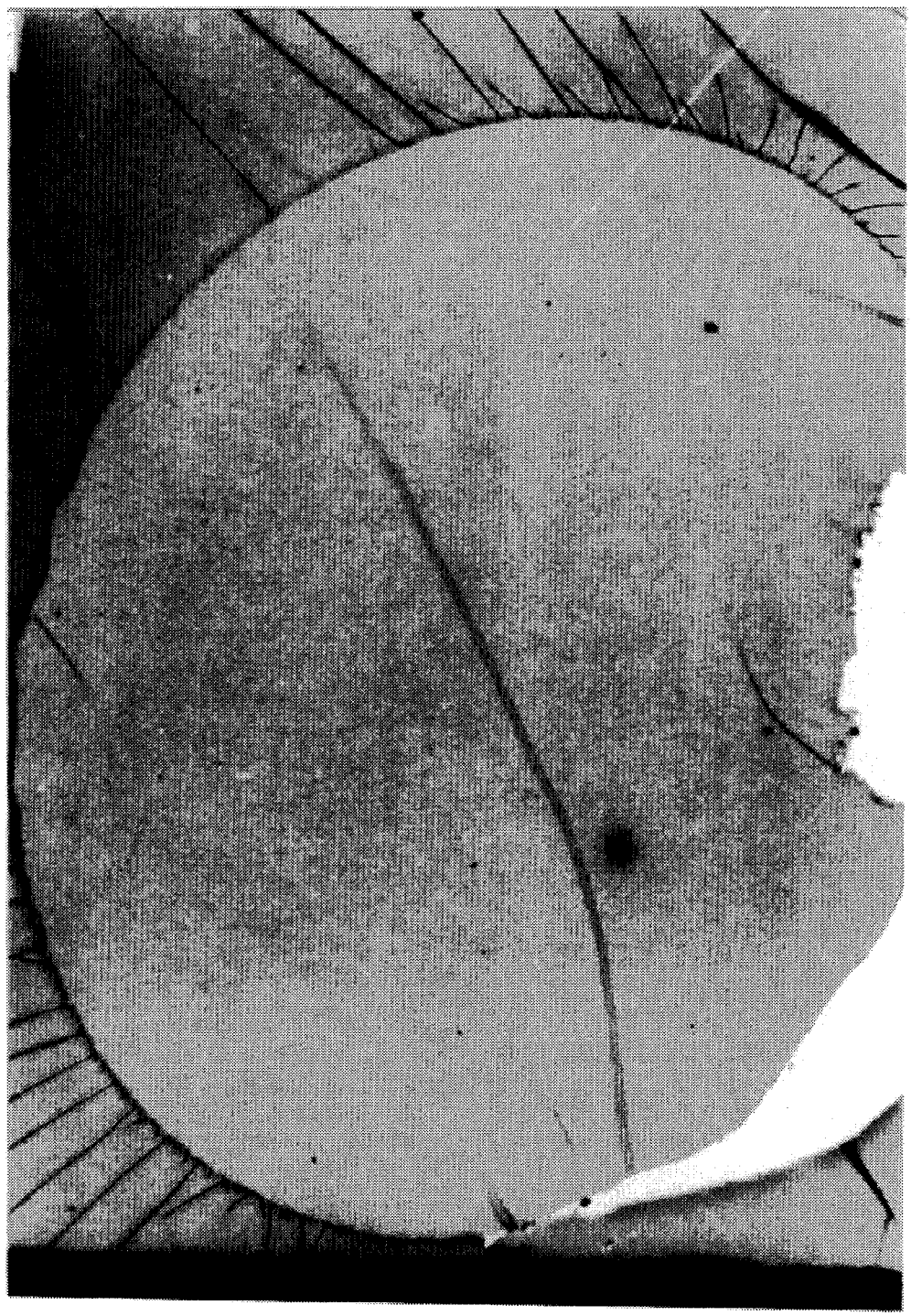
FIG. 2 is a cross-sectional electron micrograph of a polybutadiene composition article prepared in Example 1, before extracting with toluene.
Figure 3:
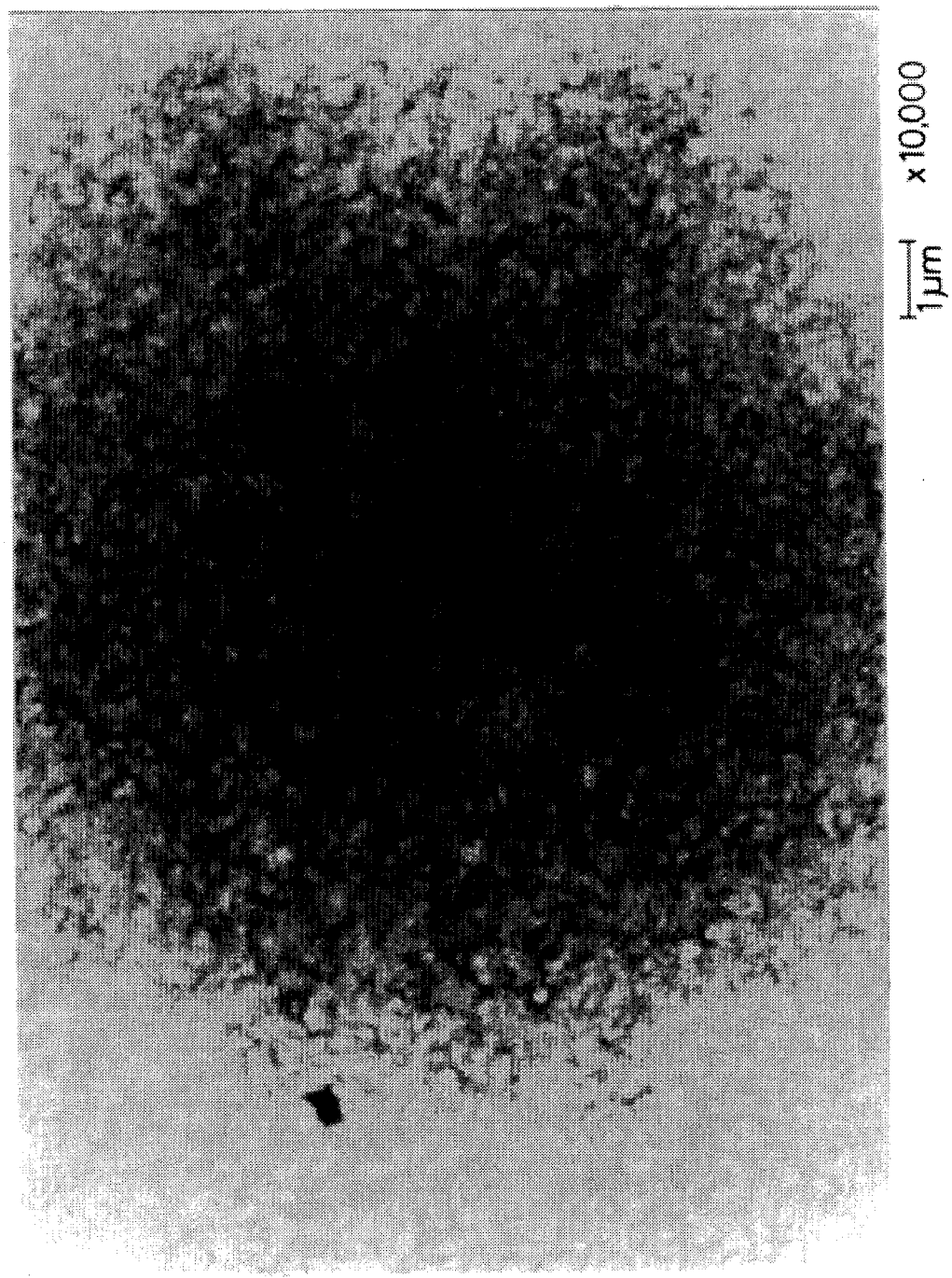
FIG. 3 is a magnified cross-sectional electron micrograph of a portion of the polybutadiene article before extracting with toluene, as shown in FIG. 2, at a magnification of 10,000.
Figure 4:
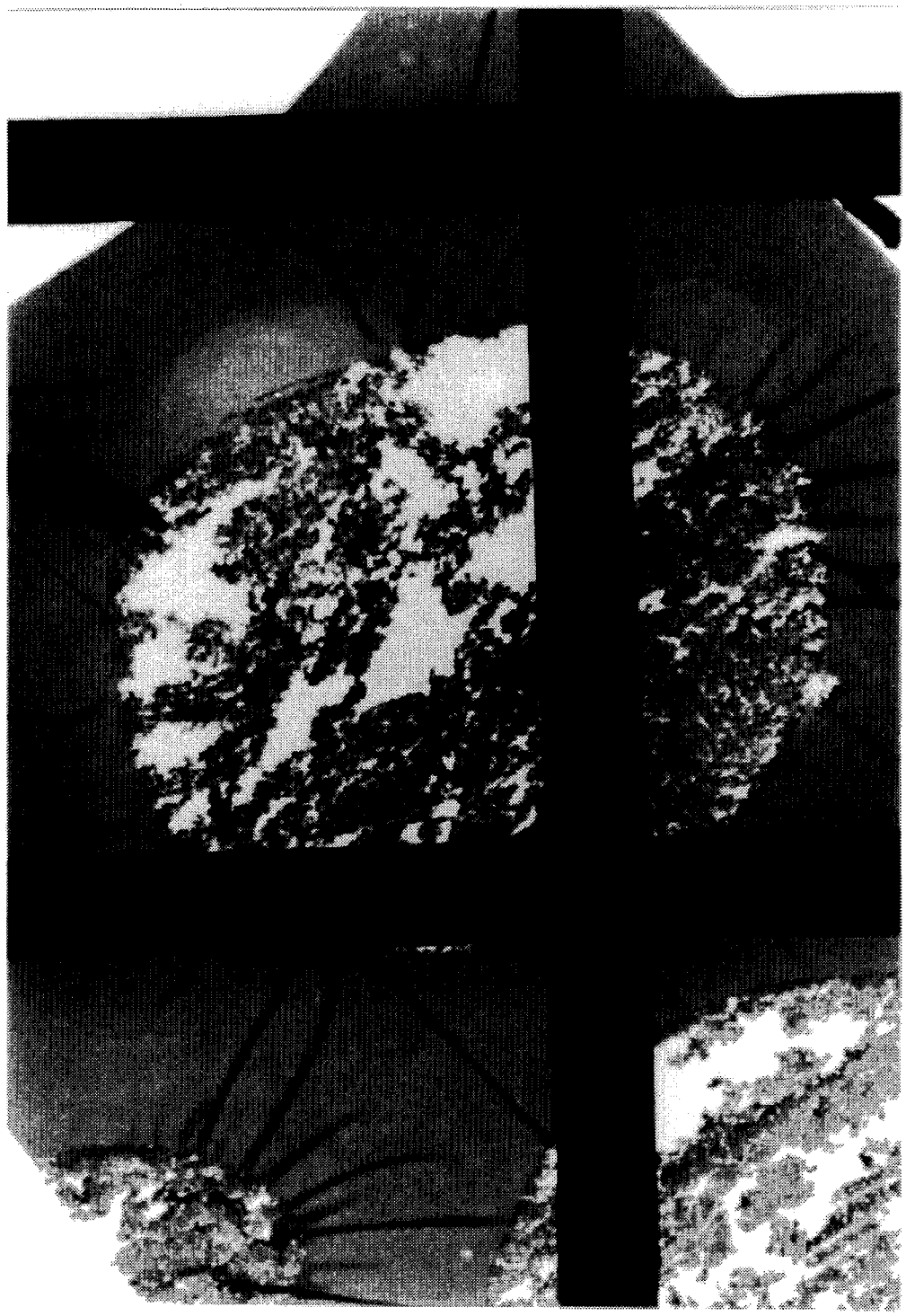
FIG. 4 is a cross-sectional electron micrograph of a polybutadiene composition article prepared in Example 1 and extracted with toluene.
Figure 5:
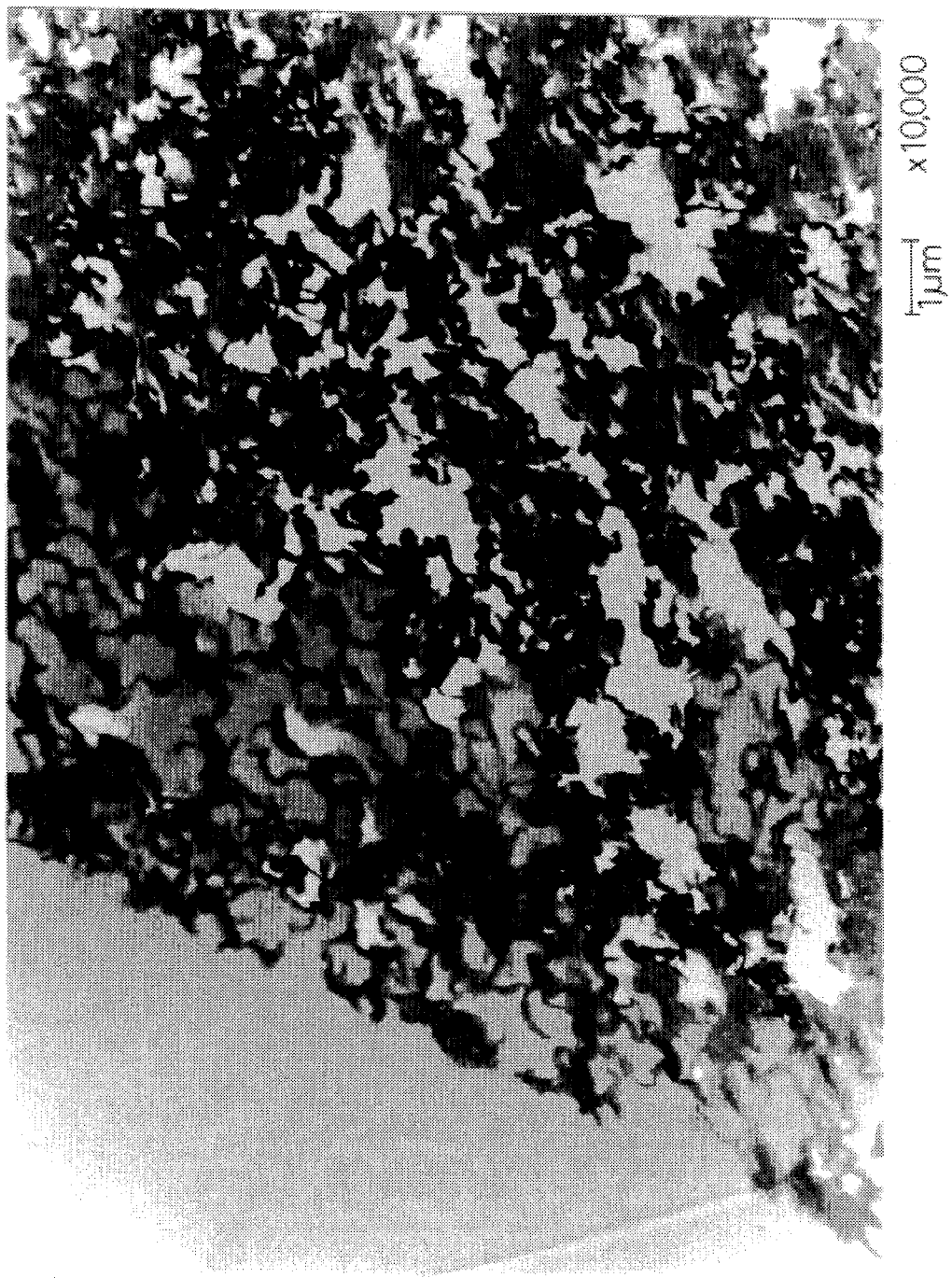
FIG. 5 is a magnified cross-sectional electron micrograph of a portion of the polybutadiene composition article extracted with toluene, as shown in FIG. 4, at a magnification of 10,000.

FIG. 2 is a cross-sectional electron micrograph of the polybutadiene composition of Example 1 before the toluene extraction. FIG. 3 is a magnified photograph of a portion of the cross-sectional electron micrograph of FIG. 2. FIG. 4 is a cross-sectional electron micrograph of the polybutadiene composition of Example 1 after the toluene extraction. FIG. 5 is a magnified photograph of a portion of the cross-sectional electron micrograph of FIG. 4. From a comparison of the cross-sectional electron micrographs of FIGS. 2 and 3 before the toluene extraction with that of FIGS. 4 and 5 after the toluene extraction, it is understood that in the toluene-extracted polybutadiene composition, a toluene-insoluble fraction consisting of the high melting temperature 1,2-polybutadiene component is dispersed in the form of fine grains, scales, or flakes.

The polybutadiene composition of Example 1 was subjected to a $^{13}$C-NMR measurement. It was found that in peaks corresponding to vinyl groups, peaks corresponding to structures other than the syndiotactic 1,2-structure did not substantially appear in the $^{13}$C-NMR chart. The other structures than the syndiotactic 1,2-structure were mainly cis-1,4-structures.

EXAMPLE 2

The same polymerization as that in Example 1 was carried out except that acetone was added to the polymerization mixture at a stage of 5 minutes after the start of the polymerization. The resultant polybutadiene composition grains were immersed in a 1% solution of BHT in methyl alcohol and thereafter dried in a vacuum dryer at a temperature of 50° C. for one day and night. The resultant polybutadiene composition exhibited two melting temperatures of 190.4° C. and 149.3° C. The yield of the polybutadiene composition was 92.3%. The content of a high melting temperature 1,2-polybutadiene component in the composition was 42% by weight.

The polybutadiene composition was subjected to a $^1$H-NMH measurement, and the content of 1,2-structure was determined from the resultant $^1$H-NMR chart. The content of 1,2-structure was 87.4 molar % in the entire polybutadiene composition.

The content of 1,2-structure of the high melting temperature 1,2-polybutadiene component and that of the low melting temperature 1,2-polybutadiene component were determined from the calibration curve in FIG. 1. The content of 1,2-structure of the high melting temperature 1,2-polybutadiene component was 92.7 molar % and the content of 1,2-structure of the low melting temperature 1,2-polybutadiene component was 87.2 molar %.

The content of 1,2-structure was then calculated from those of the high melting temperature 1,2-polybutadiene component and the low melting temperature 1,2-polybutadiene component as follows 92.7%×0.42+87.2%×0.58=89.5%.

The resultant 1,2-structure content of 89.5 molar % was very similar to the content of 87.4 molar % measured from the $^1$H-NMR chart.

Then the polybutadiene composition was subjected to $^{13}$C-NMR measurement. In the resultant $^{13}$C-NMR chart, it was found that almost all of the peaks corresponding to vinyl groups corresponded to syndiotactic 1,2-structure, and that no peaks corresponding to other 1, 2-structure than syndiotactic 1,2-structure, e.g., atactic 1,2-structure or isotactic 1,2-structure were recognized. The peaks other than those corresponding to 1,2-structures, were found to correspond to cis-1,4-structure.

The test results are shown in Tables 1 and 2.

EXAMPLE 3

The same polymerization as that in Example 1 was carried out except that acetone was employed in an amount of 100 ml. The resultant polybutadiene composition grains were immersed in a 1% solution of BHT in methyl alcohol, and thereafter dried in a vacuum dryer at a temperature of 50° C. for one day and night. The resultant polybutadiene composition exhibited two melting temperatures of 194.6° C. and 125.9° C. The yield of the polybutadiene composition was 86.5%.

The polybutadiene composition was subjected to a $^1$H-NMR measurement, and the content of 1,2-structure was determined from the resultant $^1$H-NMR chart. The content of 1,2-structure was 86.5 molar % in the entire polybutadiene composition.

The content of 1,2-structure of the high melting temperature 1,2-polybutadiene component and that of the low melting temperature 1,2-polybutadiene component were determined from the calibration curve in FIG. 1. The content of 1,2-structure of the high melting temperature 1,2-polybutadiene component was 94.2 molar % and the content of 1,2-structure of the low melting temperature 1,2-polybutadiene component was 79.0 molar %.

The polybutadiene composition was then subjected to $^{13}$C-NMR measurement. In the resultant $^{13}$C-NMR chart, it was found that almost all of the peaks corresponding to vinyl groups corresponded to syndiotactic 1,2-structure, and that no peaks corresponding to other 1,2-structure than syndiotactic 1,2-structure, e.g., atactic 1,2-structure or isotactic 1,2-structure were recognized. The peaks other than those corresponding to 1,2-structure were found to correspond to cis-1,4-structure.

The test results are shown in Tables 1 and 2.

EXAMPLE 4

The same polymerization as that in Example 3 was carried out except that acetone was added to the polymerization mixture at a stage of 5 minutes after the start of the polymerization. The resultant polybutadiene composition grains were immersed in a 1% solution of BHT in methyl alcohol, and thereafter dried in a vacuum dryer at a temperature of 50° C. for one day and night. The resultant polybutadiene composition exhibited two melting temperatures of 191.6° C. and 123.4° C. The yield of the polybutadiene composition was 90.7%.

The polybutadiene composition was subjected to a $^1$H-NMR measurement, and the content of 1,2-structure was determined from the resultant $^1$H-NMR chart. The content 1,2-structure was 85.8 molar % in the entire polybutadiene composition.

The content of 1,2-structure of the high melting temperature 1,2-polybutadiene component and that of the low melting temperature 1,2-polybutadiene component were determined from the calibration curve in FIG. 1. The content of 1,2-structure of the high melting temperature 1,2-polybutadiene component was 93.1 molar % and the content of 1,2-structure of the low melting temperature 1,2-polybutadiene component was 79.5 molar %.

The polybutadiene composition was then subjected to $^{13}$C-NMR measurement. In the result $^{13}$C-NMR chart, it was found that almost all of the peaks corresponding to vinyl groups corresponded to syndiotactic 1,2-structure, and that no peaks corresponding to other 1,2-structure than syndiotactic 1,2-structure, e.g., atactic 1,2-structure of isotactic 1,2-structure were recognized. The peaks other than those corresponding to 1,2-structures were found to correspond to cis-1,4-structure.

Figure 6:
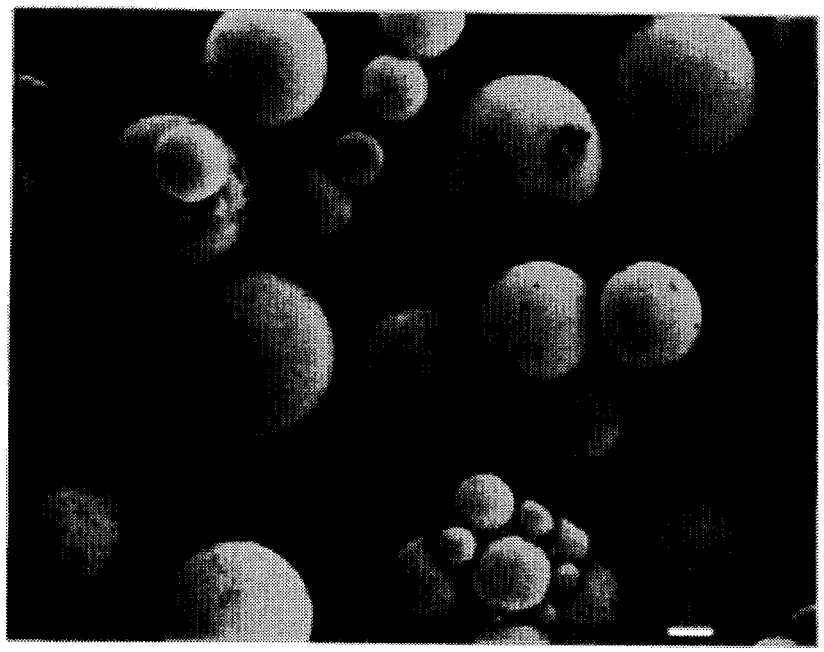
FIG. 6 is an electron micrograph of particles of polybutadiene composition prepared in Example 4, before extracting with toluene.
Figure 7:
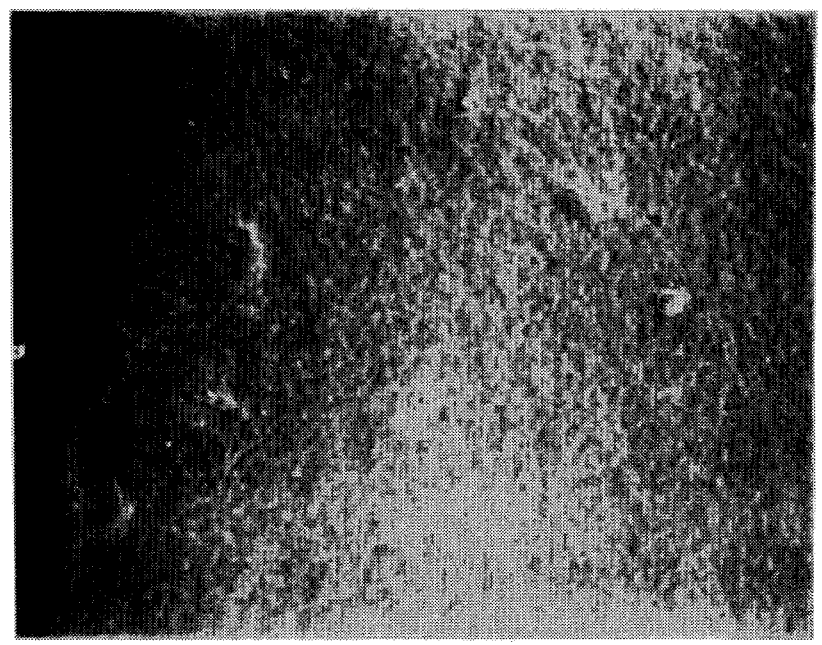
FIG. 7 is a magnified electron micrograph of a surface of a polybutadiene composition particle as shown in FIG. 6, before extracting with toluene.
Figure 8:
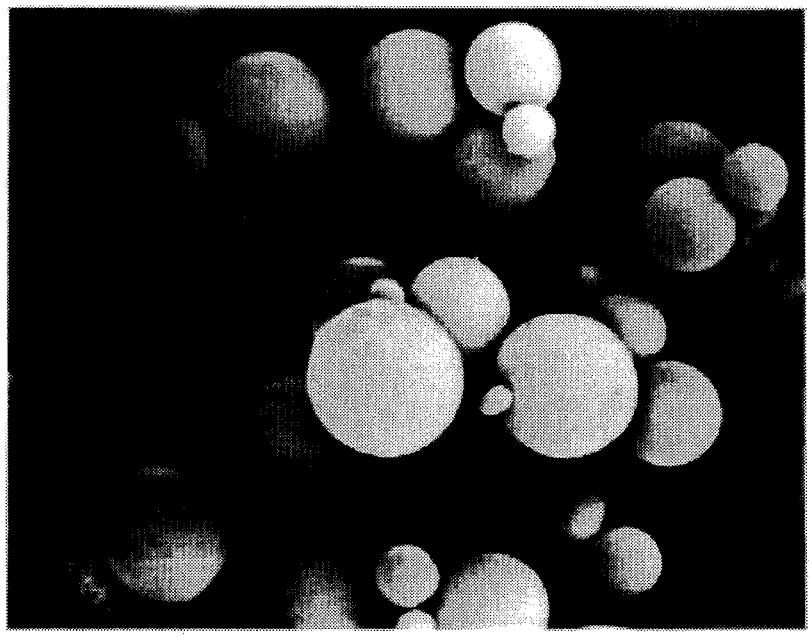
FIG. 8 is an electron micrograph of particles of the polybutadiene composition prepared in Example 4, extracted with toluene.
Figure 9:
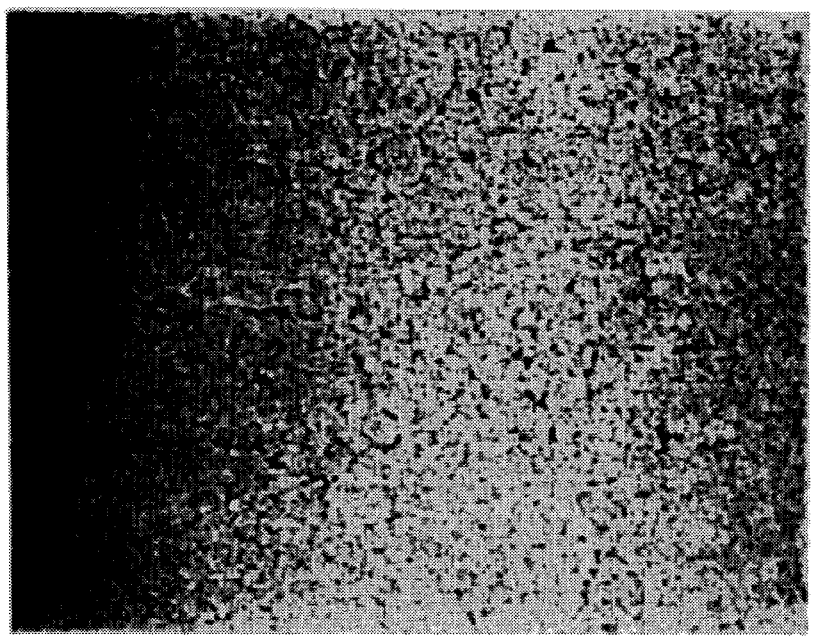
FIG. 9 is a magnified electron micrograph of a surface of a polybutadiene composition particle extracted with toluene, as shown in FIG. 9.

FIG. 6 is an electron-micrograph showing an entire view of particles of the polybutadiene composition of Example 4, which was taken before the toluene extraction. FIG. 7 is a magnified photograph of a portion of the polybutadiene composition of FIG. 6. FIG. 8 is an electron-micrograph showing an entire view of particles of the polybutadiene composition of Example 4, which was taken after the toluene extraction. FIG. 9 is a magnified photograph of a portion of the extracted polybutadiene composition of FIG. 8.

From a comparison of FIGS. 6 and 7 with FIGS. 8 and 9, it is understood that the surfaces of the fine grains shown in FIGS. 6 and 7 were smooth, whereas the surfaces of the fine grains shown in FIGS. 8 and 9 were porous. From this fact, it was confirmed that by the toluene extraction, the low melting temperature 1,2-polybutadiene component was removed from the polybutadiene composition grains.

EXAMPLE 5

Figure 11:
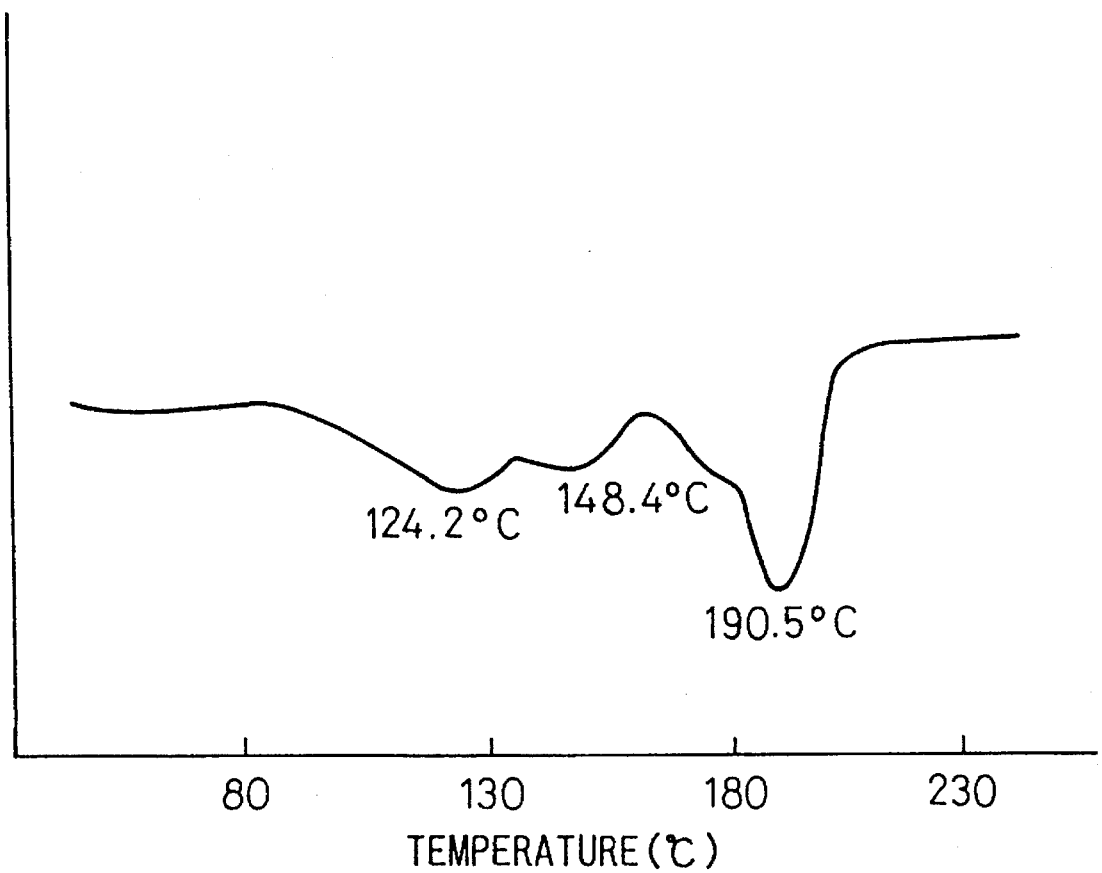
FIG. 11 is a DSC chart of the polybutadiene composition prepared in Example 5.

The same polymerization as that in Example 1 was carried out except that acetone was added in an amount of 35 ml at a stage of 2.5 minutes after the start of the polymerization, and then in an amount of 65 ml at a stage of 5 minutes after the start of the polymerization to the polymerization mixture. The resultant polybutadiene composition grains were immersed in a 1% solution of BHT in methyl alcohol, and thereafter dried in a vacuum dryer at a temperature of 50° C. for one day and night. The resultant polybutadiene composition exhibited three melting temperature of 191.6° C., 148.4° C., and 124.2° C. The DSC chart for the resultant polybutadiene composition is shown in FIG. 11. The yield of the polybutadiene composition was 90.4%.

The test results are shown in Table 1.

EXAMPLE 6

Figure 12:
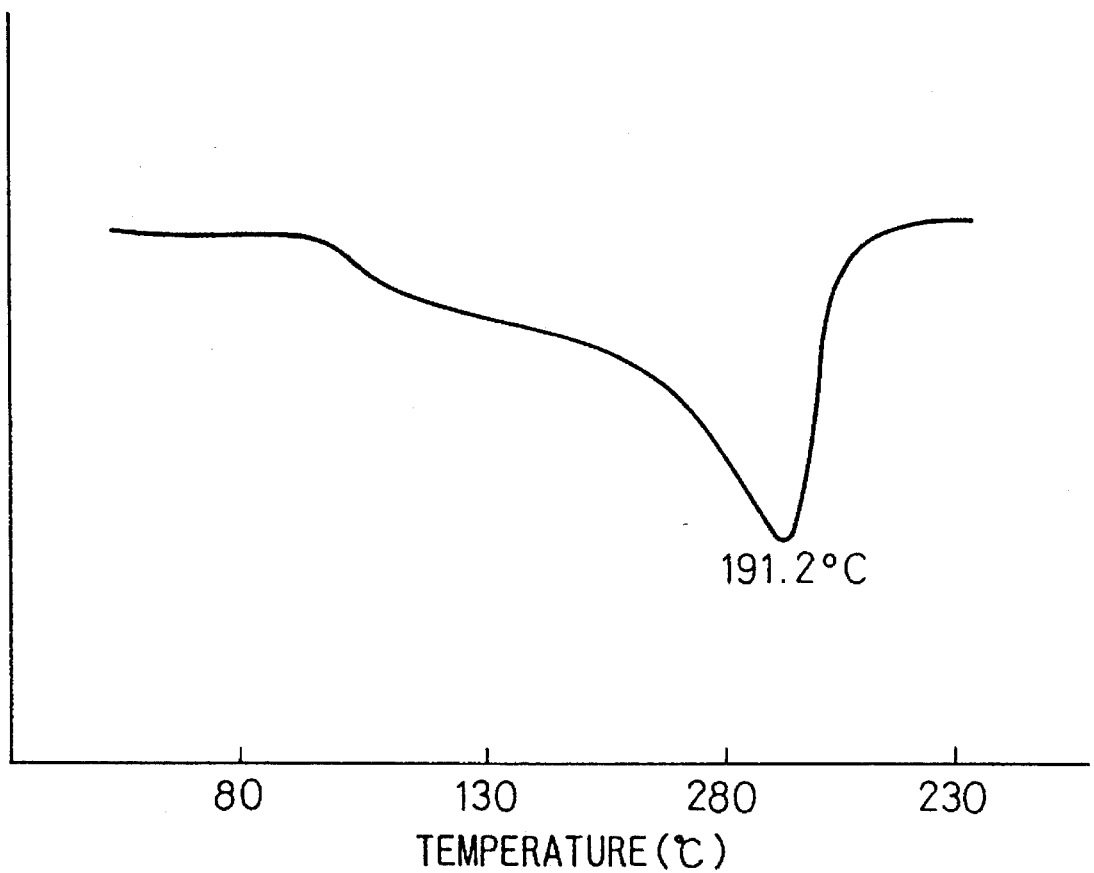
FIG. 12 is a DSC chart of polybutadiene composition prepared in Example 6.

The same polymerization as that in Example 1 was carried out except that the addition of acetone to the polymerization mixture was started at a stage of 2 minutes after the start of the polymerization and continuously carried out at an adding rate of 3.3 ml/minute for 30 minutes. The resultant polybutadiene composition grains were immersed in a 1% solution of BHT in methyl alcohol, and thereafter dried in a vacuum dryer at a temperature of 50° C. for one day and night. The resultant polybutadiene composition exhibited a highest melting temperature of 191.2° C. The resultant DSC curve had a flat plateau. The yield of the polybutadiene composition was 88.5%. The resultant DSC chart for the polybutadiene composition is shown in FIG. 12.

The test results are shown in Table 1.

EXAMPLE 7

Figure 13:
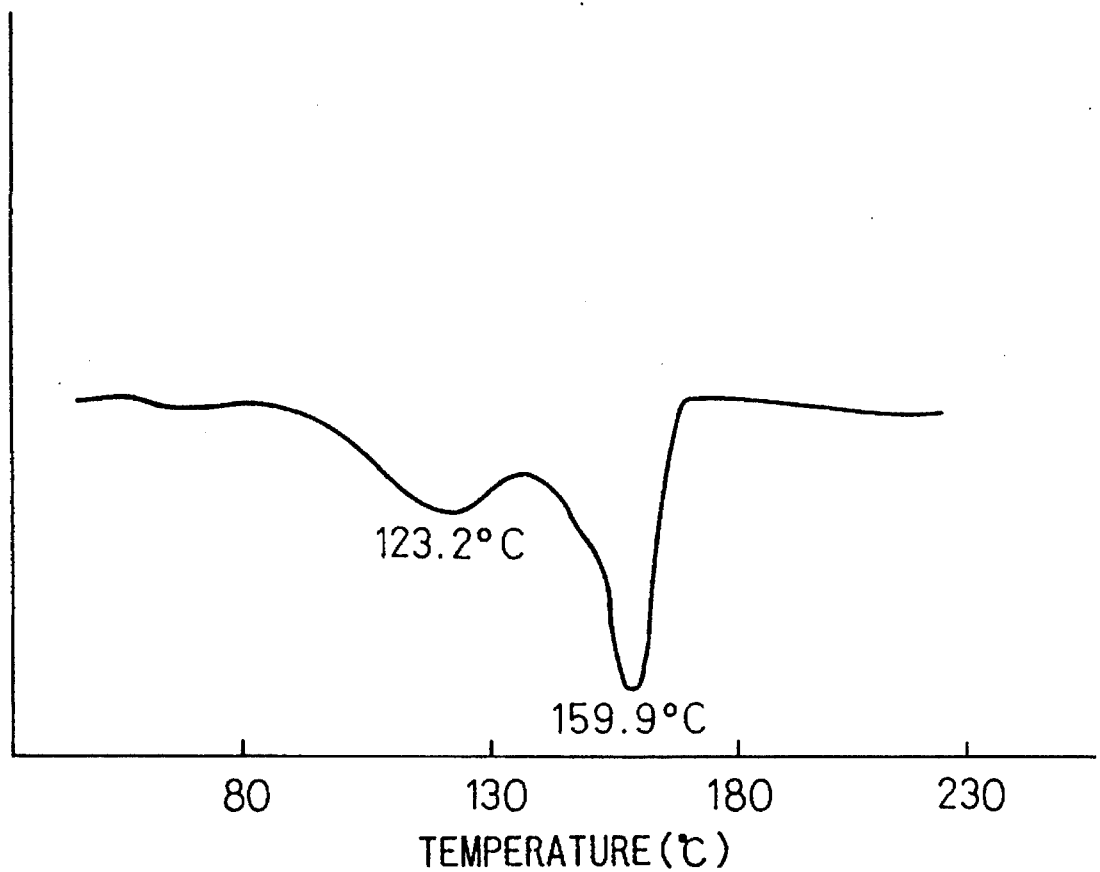
FIG. 13 is a DSC chart of polybutadiene composition prepared in Example 7.

The same polymerization as that in Example 1 was carried out except that acetone was added in an amount of 20 ml to the polymerization mixture before the start of the polymerization and then in an amount of 80 ml at a stage of 5 minutes after the start of the polymerization. The yield of the resultant polybutadiene composition grains was 90.5%. The resultant polybutadiene composition exhibited two melting temperatures of 159.9° C. and 123.2° C. The resultant DSC chart for the polybutadiene composition is shown in FIG. 13.

The content of the syndiotactic 1,2-structure determined from a $^1$H-NMR spectrum in the entire polybutadiene composition was 82.5 molar %.

The test results are shown in Table 1.

EXAMPLE 8

The same polymerization as that in Example 1 was carried out except that acetone was added in an amount of 15 ml to the polymerization mixture before the start of the polymerization, then the polymerization was started and acetone was further added in an amount of 85 ml at a stage of 5 minutes after the start of the polymerization. The yield of the resultant polybutadiene composition grains was 91.3%. The resultant polybutadiene composition exhibited two melting temperatures of 169.5° C. and 122.8° C.

The content of the syndiotactic 1,2-structure determined from the $^1$H-NMR spectrum was 83.2 molar % in the entire polybutadiene composition.

The test results are shown in Table 1.

TABLE 1

| Example No. | Addition of acetone Adding stage | Amount (ml) | Yield (%) of polybutadiene composition | Melting temperature (°C.) Highest | Melting temperature (°C.) Lowest | Content of microstructures (molar %) (*)$_1$ 1,2-vinyl | Content of microstructures (molar %) (*)$_1$ cis-1,4- | Content of high melting temperature component (%) (*)$_2$ | Molecular weight $\overline{Mw}$ | Molecular weight Mn | Molecular weight Mw/Mn | Average particle size (μm) |
|---|---|---|---|---|---|---|---|---|---|---|---|---|
| 1 | 2.5 min. after the start of polymerization | 35 | 90.9 | 190.5 | 150.7 | 88.9 | 10.7 | 23 | 19.8E4 | 9.1E4 | 2.18 | 250 |
| 2 | 5 min. after the start of polymerization | 35 | 92.3 | 190.4 | 149.3 | 87.4 | 12.2 | 42 | 17.5E4 | 8.0E4 | 2.18 | 200 |
| 3 | 2.5 min. after the start of polymerization | 100 | 86.5 | 194.6 | 125.9 | 86.5 | 13.2 | 21 | 20.5E4 | 9.3E4 | 2.20 | 200 |
| 4 | 5 min. after the start of polymerization | 100 | 90.7 | 191.6 | 123.4 | 85.8 | 13.9 | 43 | 21.3E4 | 9.5E4 | 2.24 | 300 |
| 5 | 2.5 min. after and then 5.0 min. after the start of polymerization | 35 / 65 | 90.4 | Middle 190  148.4 | 124.2 | 86.2 | 13.5 | — | 22.7E4 | 9.8E4 | 2.32 | 200 |
| 6 | From the stage of 2 min. after the start of polymerization at an adding adding rate of 3 ml/min for 30 min. | | 88.5 | Highest: 191.2° C. corresponding to highest endothermic peak | | 87.5 | 12.1 | — | 20.1E4 | 8.8E4 | 2.28 | 250 |
| 7 | Before polymerization 5 min. after polymerization | 20 / 80 | 90.5 | 159.9 | 123.2 | 82.5 | 17.2 | — | 22.3E4 | 10.2E4 | 2.19 | 200 |
| 8 | Before polymerization 5 min after polymerization start | 15 / 85 | 91.3 | 169.5 | 122.8 | 83.2 | 16.3 | — | 20.7E4 | 9.7E4 | 2.13 | 200 |

Note:
(*)$_1$In Examples 6 to 8, since the melting points of the high and low melting temperature 1,2-butadiene components are close to each other, the content of the high melting temperature 1,2-butadiene component could not be determined by an extraction method.
(*)$_2$The microstructures of the high and low melting temperature 1,2-butadiene components were determined in accordance with the calibration curve of FIG. 1. Almost all of the 1,2-vinyl structures were syndiotactic 1,2-structure.

TABLE 2

| Example No. | 1,2-Polybutadiene component (*)$_3$ | Content (molar %) 1,2-vinyl structure | Content (molar %) cis-1,4- structure |
|---|---|---|---|
| Example 1 | HMT component | 92.8 | 6.9 |
| | LMT component | 87.5 | 12.2 |
| Example 2 | HMT component | 92.7 | 7.1 |
| | LMT component | 87.7 | 12.1 |
| Example 3 | HMT component | 94.2 | 5.6 |
| | LMT component | 79.0 | 20.8 |
| Example 4 | HMT component | 93.1 | 6.7 |
| | LMT component | 79.5 | 20.3 |

Note:
(*)$_3$HMT: High melting temperature 1,2-polybutadiene component
LMT: Low melting temperature 1,2-polybutadiene component EXAMPLES 9, 10, 11 and 12

In each of Example 9, 10, 11, and 12, a natural rubber was mixed with a polybutadiene composition prepared in Example 1, 2, 4 or 5, carbon black, sulfur, and a vulcanization accelerator to provide a rubber composition. The rubber composition was shaped into a sheet and vulcanized.

The composition and vulcanization conditions of the rubber composition were as follows.

(1) Composition

| Primary Component | Amount (PHR) |
|---|---|
| NR R$_{ss}$#1 | 100 or 90 |
| SPB | 0 or 10 |
| C/B 1 SAF | 45 |
| ZnO #1 | 3 |
| Stearic acid | 2 |
| Antiaging agent (8IONA) | 1 |

| Secondary Component | Amount (PHR) |
|---|---|
| A$_{cc}$ DM | 0.6 |
| D | 0.2 |
| S | 1.5 |

(2) Knead-preparation
Primary:     A plastomill was employed.

-continued

| | |
|---|---|
| | Kneading temperature: 90° C. |
| | NR rolling for 30 seconds |
| | ↓ |
| | Kneading for 4 minutes |
| | ↓ |
| | Dumping at 160° C. |
| Secondary: | 6 inch mixing roll was employed. |
| | Rolling temperature: 60° C. |
| | Roll clearance: 1 mm |
| | Rolling for one minute |
| | ↓ |
| | Addition of fillers for |
| | 2 minutes |
| | ↓ |
| | Extrusion through a circular |
| | hole |
| | ↓ |
| | Forming into a sheet having a |
| | thickness of 1.5 mm |
| (3) Tests | |
| (i) | Mooney viscosity $ML_{1++}$ of polybutadiene composition |
| (ii) | Vulcanization conditions |
| | 145° C., t90 × 3 |
| | measured by a curastometer |
| (iii) | Tensile tests |
| | at 25° C. or 100° C. |
| | 100%, 200%, and 300% modulii |
| | Tensile strength (TB) |
| | Ultimate elongation (EB) |

Figure 14:
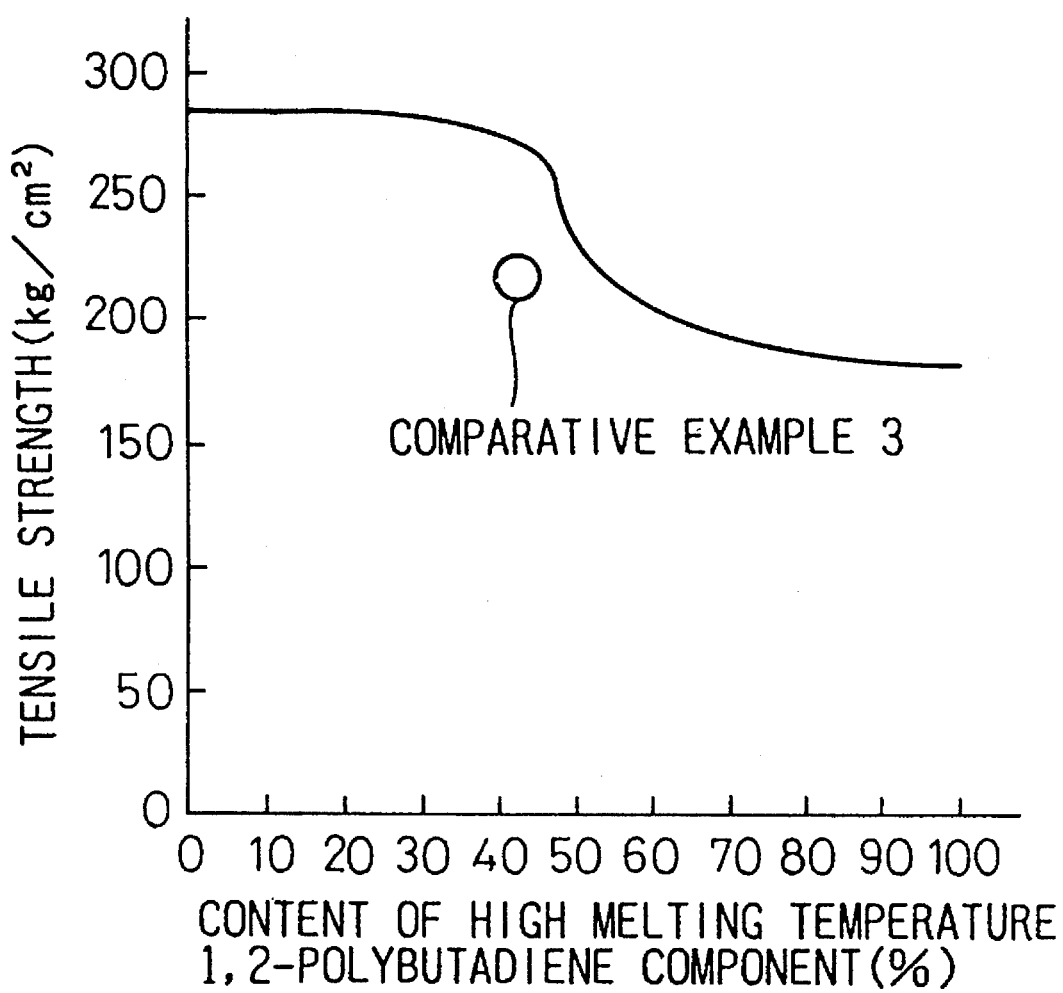
FIG. 14 is a graph showing the relationship between the content of the 1,2-polybutadiene component having the highest melting temperature in all the components and the tensile strength of polybutadiene compositions prepared in Examples 9 and 10 and Comparative Examples 1 to 3.
Figure 15:
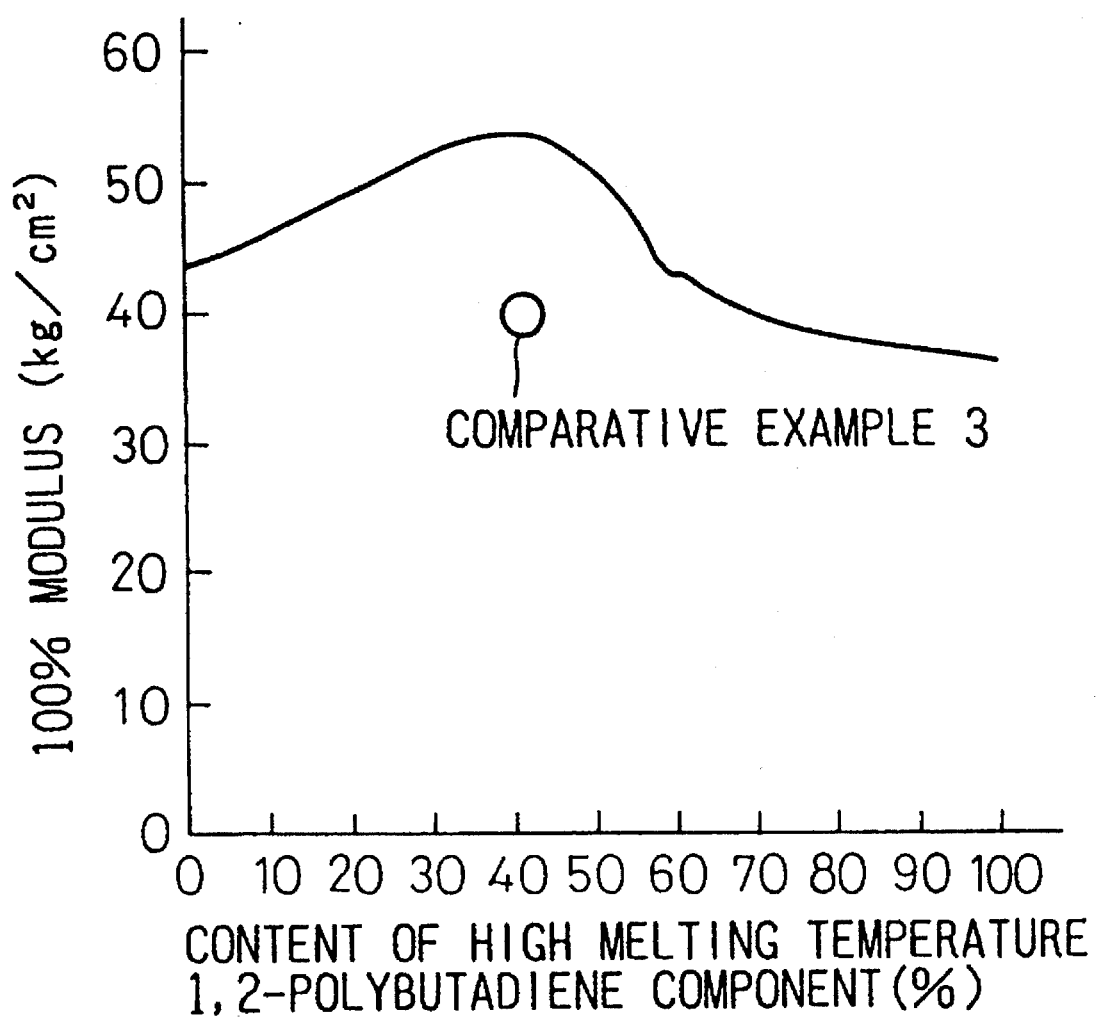
FIG. 15 is a graph showing the relationship between the content of the 1,2-polybutadiene component having the highest melting temperature in all the components and the 100 modulus of polybutadiene compositions prepared in Examples 9 and 10 and Comparative Examples 1 to 3.

The specimens of the vulcanized rubber composition sheets were subjected to the tests of 100% modulus, 200% modulus, 300% modulus, tensile strength, and ultimate elongation. The test results of Examples 9 to 12 are shown in Table 3. FIGS. 14 and 15 show the test results of Examples 9 and 10.

From the test results, it is understood that the rubber composition containing the polybutadiene composition of Example 1 or 2 exhibited significantly high modulus and an excellent tensile strength. Also, it was confirmed that an increase in Mooney viscosity of the rubber composition due to the addition of the polybutadiene composition is small.

Comparative Example 1

A rubber composition was prepared and vulcanized to provide a vulcanized rubber composition sheet by the same procedures as in Example 9 except that the polybutadiene composition was replaced by a 1,2-polybutadiene resin having only one melting temperature of 150° C.

The resultant rubber composition sheet was subjected to the same tests for 100% modulus, 200% modulus, 300% modulus, tensile strength, and ultimate elongation as in Example 9.

The test results are shown in Table 3 and FIGS. 14 and 15. For reference, the performances of a natural rubber are also shown, as a referential example's results, in Table 3.

Comparative Example 2

A rubber composition was prepared and vulcanized to provide a vulcanized rubber composition sheet by the same procedures as in Example 9 except that the polybutadiene composition was replaced by a 1,2-polybutadiene resin having only one melting temperature of 193° C.

The resultant rubber composition sheet was subjected to the same tests for 100% modulus, 200% modulus, 300% modulus, tensile strength, and ultimate elongation as in Example 9.

The test results are shown in Table 3 and FIGS. 14 and 15.

Comparative Example 3

A rubber composition was prepared and vulcanized to provide a vulcanized rubber composition sheet by the same procedures as in Example 9 except that the polybutadiene composition was replaced by a mixture of 42 parts by weight of a 1,2-polybutadiene resin having only one melting temperature of 193° C. with 58 parts by weight of another 1,2-polybutadiene resin having only one melting temperature of 150° C.

The resultant rubber composition sheet was subjected to the same tests for 100% modulus, 200% modulus, 300% modulus, tensile strength, and ultimate elongation as in Example 9.

The test results are shown in Table 3 and FIGS. 14 and 15.

TABLE 3

| | | Example No. | | | | | | | |
|---|---|---|---|---|---|---|---|---|---|
| | | Referential | Comparative Example | Example | | | | Comparative Example | |
| Item | | Example | 1 | 9 | 10 | 11 | 12 | 2 | 3 |
| Type of resin (*)$_4$ | Melting temperature (°C.) | NR (*)$_5$ | SVT-6 | Example 1 SVT-25 | Example 2 SVT-27 | Example 4 SVT-29 | Example 5 SVT-30 | SV-9 | SV-9 (M.P. 193° C.) |
| High melting temperature 1,2-polybutadiene component | | — | — | 191 | 190 | 192 | 191 | 193 | — |
| Low melting temperature 1,2-polybutadiene component | | — | 150 | 151 | 149 | 123 | 148 124 | — | SVT-6 (M.P. 150° C.) |
| Content (%) of high melting temperature 1,2-polybutadiene component | | — | 0 | 23 | 42 | 43 | — | 100 | 42 |
| Polybutadiene composition (*)$_6$ | Moony viscosity | 65 | 82 | 85 | 82 | 82 | 83 | 71 | 78 |
| | 100% Modulus (kg/cm$^2$) | 24 | 43 | 49 | 53 | 49 | 42 | 36 | 40 |
| | 200% Modulus (kg/cm$^2$) | 62 | 95 | 108 | 114 | 106 | 95 | 75 | 82 |
| | 300% Modulus (kg/cm$^2$) | 112 | 152 | 169 | 177 | 166 | 152 | 128 | 140 |

TABLE 3-continued

|  | Example No. | | | | | | | |
|---|---|---|---|---|---|---|---|---|
|  | Referential | Comparative Example | Example | | | | Comparative Example | |
| Item | Example | 1 | 9 | 10 | 11 | 12 | 2 | 3 |
| Tensile strength (kg/cm$^2$) | 278 | 283 | 278 | 271 | 271 | 277 | 182 | 221 |
| Ultimate elongation (%) | 620 | 560 | 490 | 470 | 490 | 520 | 420 | 470 |

Note:
(*)$_4$Polymerization temperatue: 30° C.
(*)$_5$NR = natural rubber
(*)$_6$Testing temperature: room temperature As clearly illustrated in the examples, the polybutadiene composition of the present invention comprises two or more 1,2-polybutadiene components different in melting point from each other, and usually, the 1,2-polybutadiene component having the highest melting temperature is substantially evenly dispersed in a matrix consisting essentially of the remaining 1,2-polybutadiene component or components. Due to the specific features of the present invention when the polybutadiene composition is blended, as a reinforcing material, to a rubber or synthetic resin material, the 1,2-polybutadiene component having the highest melting temperature is uniformly dispersed in the form of fine grains, scales, flakes, and/or short fibers in the rubber or synthetic resin to provide a rubber alloy or synthetic resin alloy having a high modulus, a satisfactory ultimate elongation, and a high mechanical strength.

The polybutadiene composition of the present invention per se can be shaped by an injection molding method or a film-forming method, and the resultant molded article or film exhibits a high mechanical strength and an excellent impact strength.

The processes of the present invention can produce an advantageous polybutadiene composition at a high yield.

EXAMPLES 13, 14 and 15

In each of Examples 13, 14 and 15, the same procedures as in Example 1 were carried out except that the polymerization temperature was changed from 30° C. to 40° C., and the addition of acetone was carried out at two minutes in Example 13, three minutes in Example 14 and seven minutes in Example 15, after the start of the polymerization.

The test results are shown in Table 4.

Comparative Example 4

The same procedures as Example 13 were carried out except that 35 ml of aceton was added to the polymerization mixture before the start of the polymerization. The resultant polymer consisted of one single type of syndiotactic 1,2-polybutadiene having a melting temperature of 150° C.

The test results are shown in Table 4.

EXAMPLES 16 to 18

In each of Examples 16 to 18, the same procedures as in Example 1 were carried out except that the polymerization temperature was changed from 30° C. to 10° C., and the acetone was added to the polymerization mixture at one minute in Example 16, three minutes in Example 17 and five minutes in Example 18, after the start of the polymerization.

The test results are shown in Table 4.

Comparative Example 5

The same procedures as in Example 16 were carried out except that 35 ml of acetone was added to the polymerization mixture before the start of the polymerization. The resultant polymer consisted of one single type of syndiotactic 1,2-polybutadiene having a melting temperature of 150° C.

The test results are shown in Table 4.

TABLE 4

| | | | | | | Item | | | | | | |
|---|---|---|---|---|---|---|---|---|---|---|---|---|
| Exam- | Addition of acetone | | Yield (%) of poly- buta- diene | Melting temperature (°C.) | | Content of micro- structures (molar %) | | Content of high melting tempera- ture com- | Molecular weight | | | Aver- age parti- cle |
| ple No. | Adding stage | Amount (ml) | composi- tion | High- est | Lowest | 1,2- vinyl | cis- 1,4- | ponent (%) | $\overline{Mw} \times 10^4$ | Mn × 10$^4$ | Mw/Mn | size (μm) |
| Example | | | | | | | | | | | | |
| 13 | 2.0 min. after the start of polymerization | 30 | 84.9 | 185.0 | 150.0 | 88.5 | 11.3 | 30 | 9.2 | 4.5 | 2.04 | 160 |
| 14 | 3.0 min. after the start of polymerization | 30 | 97.4 | 180.9 | 150.0 | 88.3 | 11.4 | 37 | 9.5 | 4.4 | 2.16 | 210 |
| 15 | 7.0 min. after the start of polymerization | 30 | 96.9 | 183.5 | 149.3 | 89.6 | 10.1 | 57 | 9.7 | 4.6 | 2.11 | 165 |

TABLE 4-continued

| Example No. | Addition of acetone | | Yield (%) of poly- buta- diene composi- tion | Melting temperature (°C.) | | Content of micro- structures (molar %) | | Content of high melting tempera- ture com- ponent (%) | Molecular weight | | | Aver- age parti- cle size (μm) |
|---|---|---|---|---|---|---|---|---|---|---|---|---|
| | Adding stage | Amount (ml) | | High- est | Lowest | 1,2- vinyl | cis- 1,4- | | $\overline{Mw} \times 10^4$ | $Mn \times 10^4$ | Mw/Mn | |
| 16 | 1.0 min. after the start of polymerization | 60 | 96.5 | 196.3 | 149.8 | 86.9 | 12.9 | 2 | 87.3 | 25.5 | 3.42 | 175 |
| 17 | 3.0 min. after the start of polymerization | 60 | 97.4 | 196.7 | 149.9 | 88.2 | 11.5 | 9 | 86.1 | 24.3 | 3.54 | 210 |
| 18 | 5.0 min. after the start of polymerization | 60 | 96.9 | 197.5 | 148.1 | 87.4 | 12.3 | 15 | 84.7 | 21.9 | 3.86 | 180 |
| Com- par- ative Exam- ple | | | | | | | | | | | | |
| 4 | Before polymerization | 35 | 79.8 | 150 | | 86.7 | 13.0 | 0 | 9.0 | 4.3 | 2.09 | 190 |
| 5 | Before polymerization | 35 | 97.6 | 150 | | 86.5 | 13.2 | 0 | 89.0 | 23.7 | 3.76 | 195 |

Examples 19 to 24 and Comparative Examples 6 and 7

Each of the polymers obtained in Examples 13 to 18 and Comparative Examples 4 and 5 was subjected to the same procedures for preparing a rubber composition and the same tests as described in Example 9.

The test results are shown in Table 5.

TABLE 5

| | | | Example No. | | | | | | | |
|---|---|---|---|---|---|---|---|---|---|---|
| | | | Example | | | Comparative | Example | | | |
| Item | | Comparative Example 6 | 19 Example 13 | 20 Example 14 | 21 Example 15 | Example 7 Comparative Example 5 | 22 Example 16 | 23 Example 17 | 24 Example 18 |
| High melting temperatue 1,2-polybutadiene component | Melting temperature (°C.) | — | 185.0 | 180.9 | 183.5 | — | 196.3 | 196.7 | 197.5 |
| Low melting temperature 1,2-polybutadiene component | | 151.8 | 150.0 | 150.0 | 149.3 | 149.5 | 149.8 | 149.9 | 148.1 |
| Content (%) of high melting temperature 1,2-polybutadiene component | | 0 | 30 | 37 | 57 | 0 | 2 | 9 | 15 |
| Polybutadiene composition (*)₆ | Moony viscosity | 81 | 78 | 82 | 78 | 83 | 87 | 86 | 79 |
| | 100% Modulus (kg/cm²) | 42 | 47 | 49 | 50 | 55 | 56 | 54 | 51 |
| | 200% Modulus (kg/cm²) | 94 | 106 | 109 | 112 | 116 | 121 | 120 | 115 |
| | 300% Modulus (kg/cm²) | 159 | 175 | 177 | 180 | 185 | 191 | 191 | 186 |
| | Tensile strength (kg/cm²) | 318 | 310 | 307 | 288 | 312 | 314 | 308 | 292 |
| | Ultimate elongation (%) | 550 | 516 | 516 | 475 | 500 | 495 | 483 | 471 |

We claim:

1. A polybutadiene composition comprising at least two polybutadiene components which differ from each other in melting temperature and each having, as a principal structure, a 1,2-polybutadiene structure, wherein a polybutadiene component having the highest melting temperature has a melting temperature of at least 155° C., another polybutadiene component having the lowest melting temperature has a melting temperature of at least 105° C. but not more than 155° C.; the difference in the melting temperature between the highest melting temperature polybutadiene component and the lowest melting temperature polybutadiene component is in a range of from 20° C. to 125° C.; and the highest melting temperature polybutadiene component is present in an amount of 5 to 65% by weight based on the total weight of the composition.

2. The polybutadiene composition as claimed in claim 1, wherein each polybutadiene component consisting essentially of a polybutadiene composed of a syndiotactic 1,2-structure.

3. The polybutadiene composition as claimed in claim 1, wherein in the at least two polybutadiene components different in melting temperature from each other, a component having a highest melting temperature is dispersed in a matrix consisting of the other component or components.

4. The polybutadiene composition as claimed in claim 3, wherein the dispersed polybutadiene component having the highest melting temperature is in the form of fine grains, scales, flakes, or short fibers.

5. A process for producing the polybutadiene composition as claimed in claim 1, comprising suspension-polymerizing a butadiene monomer comprising as a principal component, 1,3-butadiene in a polymerization system containing water in the presence of a catalyst comprising at least one transition metal compound, at least one organic compound of the Group I to III metals, and at ease one member selected from the group consisting of carbon disulfide, phenyl isothiocyanate, and xanthic acid, characterized in that after the polymerization is started, a melting temperature-regulating agent comprising at least one member selected from the group consisting of ketones, aldehydes, alcohols, esters, nitriles, sulfoxides, amides, and phosphoric acid esters is added into the polymerization system in one adding operation or in two or more separate adding operations.

6. A process for producing the polybutadiene composition as claimed in claim 1, comprising suspension-polymerizing a butadiene monomer comprising as a principal component 1,3-butadiene in a polymerization system containing water in the presence of a catalyst comprising at least one transition metal compound, at least one organic compound of the Group I to III metals, and at least one member selected from the group consisting of carbon disulfide, phenyl isothiocyanate, and xanthic acid, characterized in that the polymerization is carried out while continuously adding a melting temperature-regulating agent comprising at least one member selected from the group consisting of ketones, aldehydes, alcohols, esters, nitriles, sulfoxides, amides, and phosphoric acid esters into the polymerization system.

* * * * *

UNITED STATES PATENT AND TRADEMARK OFFICE
CERTIFICATE OF CORRECTION

PATENT NO. : 5,468,822
DATED : November 21, 1995
INVENTOR(S) : Nobuhiro Tsujimoto, et al.

It is certified that error appears in the above-identified patent and that said Letters Patent is hereby corrected as shown below:

On cover page, item [75]; the first inventors name should read "Nobuhiro Tsujimoto";

item [30]; the Japanese priority document "5-02136" should read -- 5-21368--

Signed and Sealed this

Twenty-seventh Day of February, 1996

Attest:

BRUCE LEHMAN

Attesting Officer

Commissioner of Patents and Trademarks